(12) United States Patent
Furuki et al.

(10) Patent No.: US 12,445,882 B2
(45) Date of Patent: Oct. 14, 2025

(54) MEASUREMENT DEVICE AND MEASUREMENT METHOD

(71) Applicant: ANRITSU CORPORATION, Kanagawa (JP)

(72) Inventors: Atsushi Furuki, Kanagawa (JP); Yasuji Ishizuka, Kanagawa (JP); Shinichi Seto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 554 days.

(21) Appl. No.: 17/664,493

(22) Filed: May 23, 2022

(65) Prior Publication Data

US 2023/0070916 A1    Mar. 9, 2023

(30) Foreign Application Priority Data

Sep. 6, 2021 (JP) ................. 2021-144856

(51) Int. Cl.

| | |
|---|---|
| *H04W 24/10* | (2009.01) |
| *G01S 19/25* | (2010.01) |
| *H04B 7/185* | (2006.01) |
| *H04B 17/15* | (2015.01) |
| *H04J 3/06* | (2006.01) |
| *H04W 56/00* | (2009.01) |
| *H04W 84/06* | (2009.01) |

(52) U.S. Cl.
CPC .......... *H04W 24/10* (2013.01); *G01S 19/256* (2013.01); *H04B 17/15* (2015.01); *H04J 3/0644* (2013.01); *H04J 3/0667* (2013.01); *H04W 56/001* (2013.01); *H04W 56/003* (2013.01)

(58) Field of Classification Search
None
See application file for complete search history.

(56) References Cited

U.S. PATENT DOCUMENTS

| | | | |
|---|---|---|---|
| 6,081,691 A | 6/2000 | Renard et al. | |
| 2021/0286086 A1* | 9/2021 | Savoy, Jr. | ............. G01S 19/215 |
| 2021/0305680 A1* | 9/2021 | Amor | ...................... G01S 19/43 |
| 2021/0311203 A1* | 10/2021 | Reis | ........................ G01S 19/38 |
| 2022/0342082 A1* | 10/2022 | Zhang | ..................... G01S 19/08 |

FOREIGN PATENT DOCUMENTS

| | | |
|---|---|---|
| JP | H11-513796 A | 11/1999 |
| JP | 2018-157375 A | 10/2018 |

* cited by examiner

*Primary Examiner* — Scott M Sciacca
(74) *Attorney, Agent, or Firm* — McDonald Hopkins LLC

(57) ABSTRACT

A network measurement device includes a setting control unit that sets, for example, a single GNSS as a transmission source of a signal of a multi-band, a multi-band abnormality detection unit that detects a multi-band reception abnormality based on an existing GNSS antenna receiving a signal in the multi-band transmitted from the GNSS, which is the transmission source, and reception signal information obtained by reception processing in a state in which the network measurement device is connected to the apparatus of a moving destination, for example, a boundary clock, and the existing GNSS antenna is connected to an antenna input terminal, for example, and an alert notification control unit that notifies a user of an alert notification that a multi-band reception abnormality occurs when a multi-band reception abnormality is detected.

10 Claims, 10 Drawing Sheets

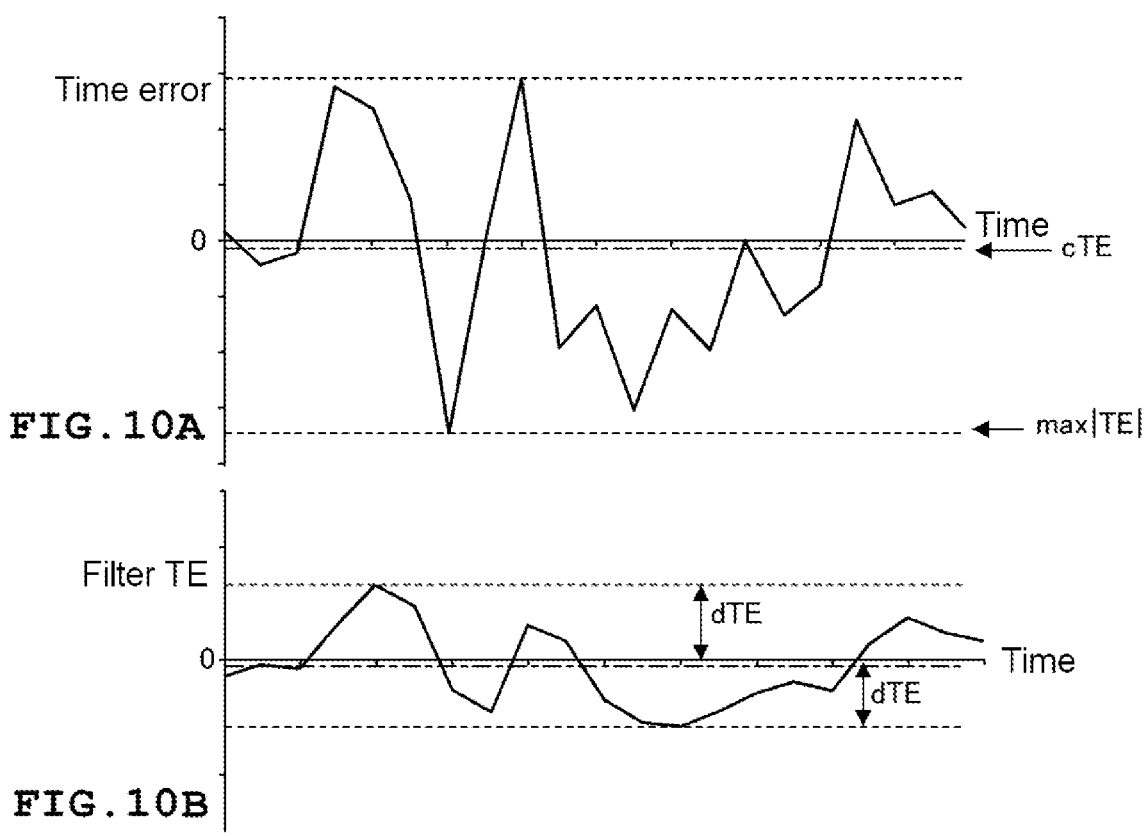

MEASUREMENT DEVICE AND MEASUREMENT METHOD

TECHNICAL FIELD

The present invention relates to a portable measurement device and measurement method for receiving a plurality of satellite information about a plurality of bands (frequency bands) provided by any global navigation satellite system (GNSS: satellite positioning system), performing positioning or time synchronization, and performing measurement on a device under test by using those values.

BACKGROUND ART

In a receiver that processes satellite information (reception signal information) received from the GNSS, for example, a multi-GNSS technique for performing a signal reception and a position calculation based on both a GPS satellite and a GLONASS satellite has been known in the related art (see, for example, Patent Document 1).

Further, as a measurement system for measuring the performance of a network, a server measurement device and a plurality of client measurement devices, which are connected to the network that is a measurement target (the network under test), are included, and the server measurement device is known to have a configuration in which a client measurement device switches an application currently running to a predetermined application and measures the characteristics of the network under test in cooperation with the client measurement device (see, for example, Patent Document 2).

RELATED ART DOCUMENT

Patent Document

[Patent Document 1] JP-T-11-513796
[Patent Document 2] JP-A-2018-157375

DISCLOSURE OF THE INVENTION

Problem that the Invention is to Solve

As for the configuration example of a measurement system described in Patent Document 2, for example, a measurement device (a network measurement device) is considered, which applies the multi-GNSS technique described in Patent Document 1, performs positioning or time synchronization by receiving a plurality of satellite information about different bands from a plurality of GNSSs, and performs measurement on a network under test by using those values.

Further, in this case, it is assumed that an operation is performed such that using a portable measurement device, the measurement device is moved to a disposition location of each client distributively disposed in a network under test as needed, is connected to the client at each of the locations of a moving destination, and measures whether the network under test is being operated correctly based on the reception signal information about the plurality of bands (multi-band) transmitted from any GNSS.

FIGS. 11A and 11B illustrate examples of a configuration of a network that is a measurement target of a portable measurement device and a disposition mode of a portable measurement device 8 in the network. This network has a configuration in which an apparatus that operates as a master (grandmaster clock) 5, an apparatus that operates as a slave (boundary clock) 6, and a plurality of apparatuses 7a, 7b, 7c, and 7d that operate as slaves with the apparatus 6 as a master are connected by a communication path with a predetermined communication standard. In this network, for example, the apparatus 6 synchronizes with the reference time by making the apparatus 5, which is a providing source of the time information (reference time) received from the GNSS, communicate with the apparatus 6 based on a precision time protocol (PTP), and when the apparatuses 7a, 7b, 7c, and 7d are in synchronization with the reference time by making the apparatus 6 communicate with the apparatuses 7a, 7b, 7c, and 7d based on the PTP, the apparatuses 7a, 7b, 7c, and 7d operate in synchronization with the grandmaster clock.

FIG. 11A illustrates a disposition mode of the measurement device 8 when performing one pulse per second time error (1PPS TE) measurement, and FIG. 11B illustrates a disposition mode of the measurement device 8 when performing packet time error (Packet TE) measurement. The 1PPS TE measurement and the Packet TE measurement are included in the measurement (time synchronization error measurement) related to the time synchronization of the network under test (apparatus 7a), as will be described later. In the 1PPS TE measurement, as illustrated in FIG. 11A, the portable measurement device 8 is moved to, for example, the location of the apparatus 7a at an end portion of the network having the above configuration (the network under test) and connected to the apparatus 7a, and the 1PPS TE measurement is performed by comparing a reference 1PPS signal generated based on the reception signal information from the GNSS at the location and a signal output from the apparatus 7a (a 1PPS signal under test). Based on the phase comparison result between the reference 1PPS signal and the 1PPS signal under test, it is possible to perform measurement (for example, time synchronization error measurement) related to time synchronization of the network under test (apparatus 7a). The 1PPS TE measurement is configured such that the measurement devices 8 are moved to the locations of the apparatuses 7b, 7c, and 7d, and connect to the apparatuses 7b, 7c, and 7d, and the same time synchronization error measurement as described above is performed at each location.

Regarding the Packet TE measurement, as illustrated in FIG. 11B, for example, it is configured such that the measurement device 8 is moved to the location of the apparatus 7a and is connected to the network under test in place of the apparatus 7a (replace the apparatus 7a with the measurement device 8), and then the apparatus 6 as a master for the apparatus 7a, measures a packet time error (Packet TE) of a precision time protocol packet (PTP packet) received from the apparatus 5 that is a higher-level apparatus of the apparatus 6. Also in this case, it is possible to perform the same Packet TE measurement as described above after the measurement devices 8 are moved to the locations of the apparatuses 7b, 7c, and 7d as needed, and are connected to the network under test in place of the apparatuses 7b, 7c, and 7d.

In this way, the time synchronization error measurement in the network under test includes the 1PPS TE measurement and the Packet TE measurement, and in order to check that correct time is being delivered to the network from the grandmaster clock that is a synchronization source, the portable measurement device 8 is moved between each location of the network under test and is connected to the apparatus to be tested at each location, and then the time synchronization error measurement is performed for each of the locations. Normally, the time delivered from the grandmaster clock is synchronized with the GNSS, and the measurement device 8 also needs to be synchronized with the GNSS when measuring an error. Regarding the measurement device 8, it can be expected that the measurement precision of the time synchronization error measurement is improved in a measurement device using the GNSS technology described in Patent Document 1, that is, receiving a plurality of signals (multi-band) through bands different from each other, compared to a measurement device using a single band that performs reception processing on a signal in one band.

As a representative example of the network under test having the configurations illustrated in FIGS. 11A and 11B, a so-called precision time protocol (PTP) network system (see FIG. 1) is known in which the reference time generated based on the reception signal information from the GNSS is transferred to a plurality of stations, for example, base stations that are respectively disposed in different locations, and each station, for example, the base station, is operated synchronously by using the PTP that synchronizes clocks in the entire computer network.

In recent years, a network (5G network) that performs communication with the 5th generation new radio (5G NR) standard, whose technological development is rapidly progressing, is realized by the PTP network system, and by using the PTP, it is possible to achieve clock synchronization with the precision of microseconds or less between devices in the same synchronization network.

For the 5G networks, it is necessary to establish high precision synchronization in order to reliably perform so-called handover, in which the base station that communicates with the mobile station is switched during communication for realizing high-speed communication. Further, since the required precision of the network is increasing, it is required to improve the time synchronization accuracy and precision of the measurement device with respect to the GNSS from the viewpoint of reducing the measurement error.

In order to meet the demand for such high precision time synchronization accuracy and precision, in the operation of a conventional portable measurement device (see the measurement devices 8 in FIGS. 11A and 11B) that target a 5G network under test, since the operation by using another method such as holdover may not meet the operation that requires precision such as GNSS synchronization accuracy and precision, there is a method in which the network measurement device is moved to a location where the network measurement device is used, is connected to an apparatus to be a measurement target, and then performs positioning or time synchronization by receiving satellite information about multi-band, for example, from GNSS, and performs measurement related to the apparatus under test by using those values.

In order to receive the multi-band when the above measurement is performed, for example, there are methods such as a method of inputting reception signal information received by an existing (permanent) GNSS antenna (a satellite positioning system reception antenna) provided corresponding to the apparatus under test at the location of the moving destination, and a method of connecting and using a belonging GNSS antenna that belongs to the own apparatus.

Here, the antenna environment surrounding the apparatus under test at the location of the moving destination is often an environment in which it is unclear whether or not the existing GNSS antenna supports multi-band, the quality of the GNSS antenna, amplifier, booster, cable, filter, or the like are poor, the installation condition of the GNSS antenna is bad, and the reception condition of the multi-band GNSS is not good.

In the above-mentioned multi-band support and the portable network measurement device, in a case where the operation is performed in such an environment when the GNSS multi-band reception is selected and designated, there may be situations where less than desired bands (for example, one band) can be captured, and the signal quality including the phases or the like of the plurality of bands deteriorates. As a result, there is concern that the accuracy and precision of the time synchronization error measurement on the network under test decreases.

This type of conventional network measurement device does not have a function of notification of a reception abnormality in multi-band such as an insufficient number of captured bands, deterioration of signal quality of each band, and a measurement abnormality. For this reason, it is difficult a user to recognize the above-mentioned reception abnormality in multi-band with the conventional network measurement device, and when the accuracy and precision of the time synchronization error measurement are reduced before the user recognition, there is a possibility that the reliability is reduced due to an error in determining whether or not the network under test meets the communication standard. Further, in the conventional network measurement device that does not have the function of the notification of the reception abnormality in multi-band, it is difficult to quickly respond to the reception abnormality in multi-band, for example, when the measurement result is abnormal and re-measurement is required, there is a problem that a large time loss is caused.

The present invention has been made in view of the above-mentioned circumstances, and the object of the present invention is to provide a measurement device and a measurement method that are capable of quickly responding to re-measurement when a reception abnormality in multi-band occurs and capable of performing the highly reliable and highly precise measurement when the measurement is performed on an apparatus under test at each location that requires extremely high time accuracy and precision.

Means for Solving the Problem

In order to solve above problems, there is provided a portable measurement device (50) that is moved to disposition locations of a plurality of apparatuses (21, 30, 31, 32) disposed in different locations from each other, is connected to any of the apparatuses of a moving destination, and then performs reception processing on desired signals in a plurality of frequency bands, among signals in frequency bands, which are different from each other, transmitted from a global navigation satellite system (GNSS) satellite (10*a*, 10*b*, 10*c*) that configures any GNSS, as a multi-band, and performs measurement on the apparatus of the moving destination based on information on a position or time acquired by the reception processing, the measurement device including: an antenna input terminal (51) capable of connecting a GNSS antenna (28*a*, 28*b*) that receives a signal transmitted from the GNSS; multi-band setting means (61) for selectively setting the GNSS, which is a transmission source of the signals in the plurality of frequency bands corresponding to the multi-band; reception abnormality detection means (65) for detecting a reception abnormality in the signals in the plurality of frequency bands corresponding to the multi-band based on reception signal information obtained by the reception processing on the signal transmitted from the selectively set GNSS, which is the transmission source, in a state in which the measurement device is connected to any of the apparatuses of the moving destination and the GNSS antenna is connected to the antenna input terminal; and alert notification means (66) for notifying a user of an alert notification that a multi-band reception abnormality occurs when the reception abnormality is detected.

With this configuration, in the measurement device, in a case where the measurement is performed on the apparatus under test at locations different from each other when the desired multi-band cannot be normally received from any GNSS set as the transmission source, the user can quickly handle the resetting or the like by receiving the alert notification that the multi-band reception abnormality occurs and can reliably recognize the occurrence of the multi-band reception abnormality on the apparatus under test that requires extremely high time accuracy and precision, thereby the adoption of low precision measurement results is prevented in advance, and high precision measurement can be possible by taking an action to handle reception abnormalities.

Further, in the measurement device, the antenna input terminal may be capable of connecting an existing GNSS antenna (28b) among the plurality of apparatuses in place of a belonging GNSS antenna (28a) that belongs to the measurement device, and after the existing GNSS antenna is connected to the antenna input terminal, the measurement may be performed based on the existing GNSS antenna receiving the signal transmitted from the selectively set GNSS, which is the transmission source, and the reception signal information obtained by the reception processing.

With this configuration, in the measurement device, since the measurement can be performed based on the reception signal information on the signals in the plurality of frequency bands corresponding to the multi-band, the user can be notified of the occurrence of the multi-band reception abnormality, and it is possible to check whether or not the antenna is compatible with the multi-band even with the existing GNSS antenna, for which multi-band support is uncertain, is used in place of the belonging GNSS antenna, for which multi-band support is certain, provided by the measurement device manufacturer, and the high precision measurement can be performed by taking action to dispose and connect the supporting antenna for antennas that do not support multi-band.

Further, in the measurement device, along with the alert notification, the alert notification means may further notify the user that the user is prompted to switch a setting of the selectively set GNSS, which is the transmission source, from a setting for performing reception processing on the multi-band to a setting for performing reception processing on a single band that is a signal in one frequency band.

With this configuration, the measurement device can avoid the situation where measurement becomes impossible and continue the measurement by switching to the single band setting even when the desired multi-band cannot be normally received.

Further, in the measurement device, the alert notification means may notify the user of the alert notification by at least one of displaying an alert notification message or sounding an alert sound.

With this configuration, the measurement device can reliably notify the user of the multi-band reception abnormality by displaying an alert notification message or sounding an alert sound, and maintain the recognition of the alert notification.

Further, in the measurement device, the reception abnormality detection means may include capturing means for using signals in the plurality of frequency bands corresponding to the multi-band as targets, capturing the signal transmitted from the selectively set GNSS, which is the transmission source, and determining whether or not a signal quality of the captured signal meets a predetermined signal quality of the signals in the plurality of frequency bands corresponding to the set multi-band, and the alert notification means may notify the user that multi-band reception is not possible when the signal quality of the signal captured by the capturing means does not meet the predetermined signal quality.

With this configuration, in the measurement device, when the signal quality of the captured signal does not meet the predetermined signal quality of the signals in the plurality of frequency bands corresponding to the set multi-band, the user can surely recognize that the multi-band reception is impossible and can take quick measures.

Further, in the measurement device, the capturing means may include level difference detection means for detecting a level difference between signals in the plurality of frequency bands corresponding to the multi-band, and the alert notification means may notify the user that there is an abnormality when the level difference detected by the level difference detection means exceeds a predetermined value set in advance.

With this configuration, in the measurement device, the user can reliably recognize the abnormality in the antenna system receiving the multi-band including the use of antennas that do not support the multi-band that causes the fact that the level difference between the signals in the plurality of frequency bands corresponding to the multi-band exceeds the predetermined value.

Further, in the measurement device, the capturing means may include calculation means for calculating a pseudo distance from signals in at least two frequency bands corresponding to the multi-band transmitted from the same GNSS, and the alert notification means may notify the user that there is an abnormality when the pseudo distance calculated by using the calculation means meets a condition that the pseudo distance, which is set in advance as the predetermined signal quality, is positive.

With this configuration, in the measurement device, the user can easily recognize the abnormality in the antenna system for multi-band reception when the pseudo distance is positive.

Further, in the measurement device, the measurement device may be a network measurement device that uses a network under test (1), in which the plurality of apparatuses operate in synchronization with reference time information acquired from the any GNSS, as a target, is moved to a desired location, is connected to any of the apparatuses at the locations of the corresponding moving destination, and then starts positioning at the location based on the reception signal information received from the GNSS, which is the transmission source, establishes synchronization with the selectively set GNSS, which is the transmission source, and then measures performance of the network under test.

With this configuration, in the measurement device, the plurality of base stations, the boundary clock, or the like are disposed, for example, as each apparatus, and the high precision measurement using the multi-band is possible by using the 5G network in which these apparatuses operate in synchronization with the reference time information acquired from the GNSS, as the network under test.

Further, in the measurement device, any single GNSS among GNSSs such as a GPS, a GLONASS, a Galileo, a BeiDou, and a QZSS may be set as the transmission source, and signals in the plurality of frequency bands may be received from the single GNSS.

With this configuration, the measurement device can realize high precision measurement using the multi-band by setting any single GNSS among the GNSS such as a GPS, a GLONASS, a Galileo, a BeiDou, and a QZSS as the transmission source.

Further, in the measurement device, any plurality of GNSSs among GNSSs such as a GPS, a GLONASS, a Galileo, a BeiDou, a QZSS, may be combined and set as the transmission sources, and signals in the plurality of frequency bands may be received from the plurality of GNSSs.

With this configuration, the measurement device can reliably perform the multi-band reception processing and the multi-band reception abnormality notification that effectively utilize many GNSS by combining any plurality of GNSS among the GNSS such as a GPS, a GLONASS, a Galileo, a BeiDou, and a QZSS, and setting the GNSS as the transmission source of the multi-band.

In order to solve above problems, there is provided a measurement method, which is a measurement method of performing measurement on the apparatus by using the measurement device (50), the measurement method including: a connection step (S3) of moving the measurement device to disposition locations of the plurality of apparatuses disposed in different locations from each other, connecting the measurement device to any of the apparatuses of the moving destination, and connecting the existing GNSS antenna to the antenna input terminal; a multi-band setting step (S5) of selectively setting the GNSS, which is a transmission source of the signals in the plurality of frequency bands corresponding to the multi-band; a reception abnormality detection step (S8) of detecting reception abnormality in the signals in the plurality of frequency bands corresponding to the multi-band based on reception signal information obtained by the reception processing on the signal transmitted from the selectively set GNSS, which is the transmission source; and an alert notification step (S9) of notifying a user of an alert notification that a multi-band reception abnormality occurs when the reception abnormality is detected.

With this configuration, in the measurement method, the measurement device is used, and in a case where the measurement is performed on the apparatus under test at locations different from each other when the desired multi-band cannot be normally received from any GNSS set as the transmission source, the user can quickly handle the resetting or the like by receiving the alert notification that the multi-band reception abnormality occurs and can reliably recognize the occurrence of the multi-band reception abnormality on the apparatus under test that requires extremely high time accuracy and precision, thereby the adoption of low precision measurement results is prevented in advance, and high precision measurement can be possible by taking an action to handle reception abnormalities.

Advantage of the Invention

The present invention is to provide a measurement device and a measurement method that are capable of quickly responding to re-measurement when a reception abnormality in multi-band occurs and capable of performing the highly reliable and highly precise measurement when the measurement is performed on an apparatus under test at each location that requires extremely high time accuracy and precision.

BRIEF DESCRIPTION OF THE DRAWINGS

FIGS. 10A and 10B are diagrams illustrating the characteristics related to 1PPS TE in the time synchronization error measurement of the network measurement device according to the embodiment of the present invention, where FIG. 10A illustrates fluctuation characteristics of a time error, and FIG. 10B illustrates fluctuation characteristics of a filter TE.

FIG. 11A illustrates the disposition mode of the measurement device when 1PPS TE measurement is performed, and FIG. 11B illustrates the disposition mode of the measurement device when Packet TE measurement is performed.

BEST MODE FOR CARRYING OUT THE INVENTION

Hereinafter, an embodiment of a measurement device and a measurement method according to the present invention will be described in detail with reference to the drawings.

As an embodiment of the measurement device according to the present invention, a network measurement device that measures the performance of a network under test will be described as an example. The network measurement device is a device that uses a network under test, in which a plurality of apparatuses (for example, base stations 30, 31, and 32 and a boundary clock 21 in FIG. 1) disposed in different locations from each other operate in time synchronization with reference time information acquired from any GNSS, as a target, is moved to a desired location, is connected to any of the apparatuses in the location of a corresponding moving destination, and then starts positioning at the location based on reception signal information from any GNSS, establishes time synchronization with the GNSS, which is an information acquisition source, and then measures the performance of the network under test. In particular, the network measurement device according to the present embodiment supports the reception of signals in a plurality of frequency bands (multi-band) transmitted from any GNSS, which is the information transmission source.

Figure 1:
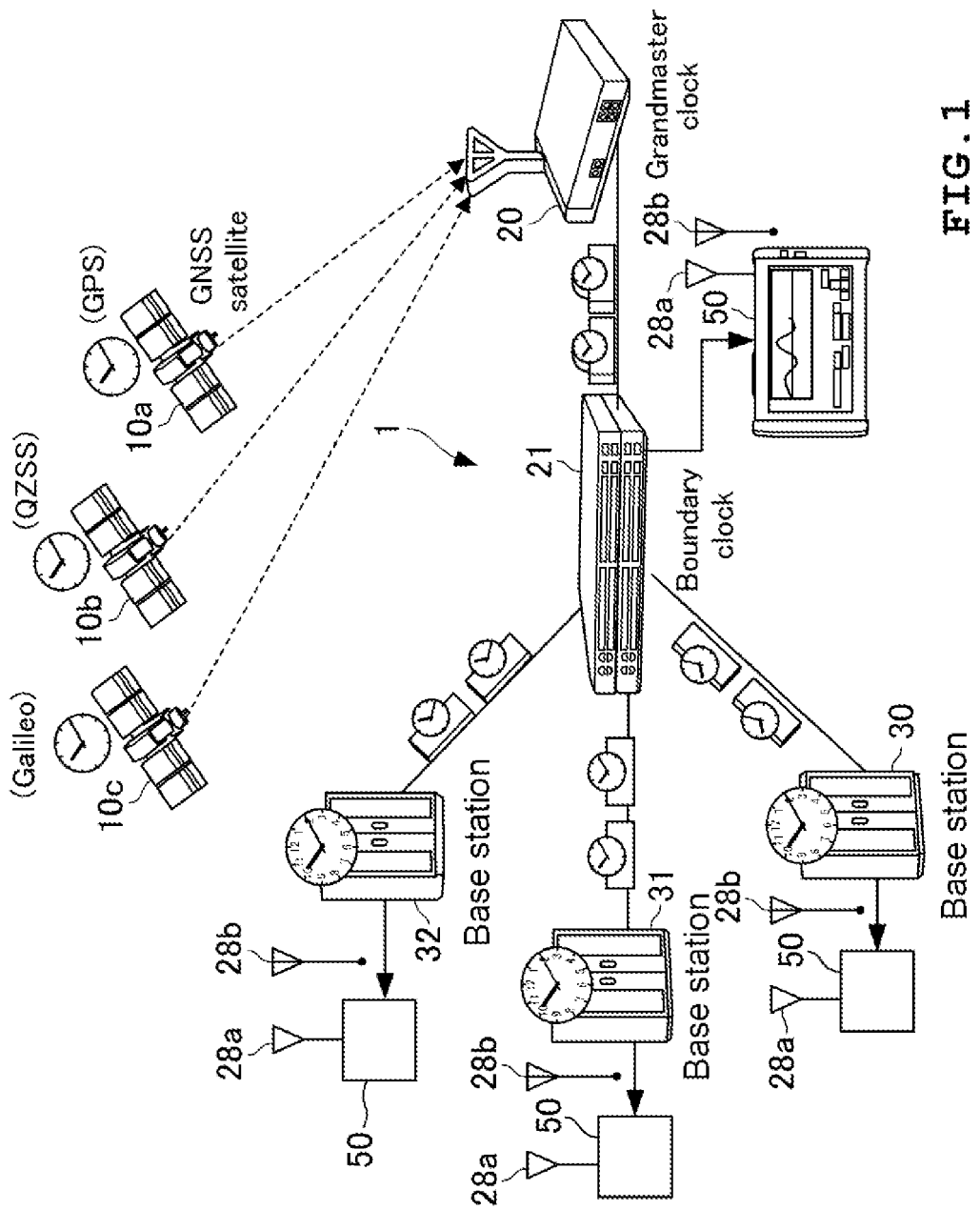
FIG. 1 is a conceptual diagram illustrating a configuration of a main part of a 5G network that is a measurement target of a network measurement device according to an embodiment of the present invention.
Figure 2:
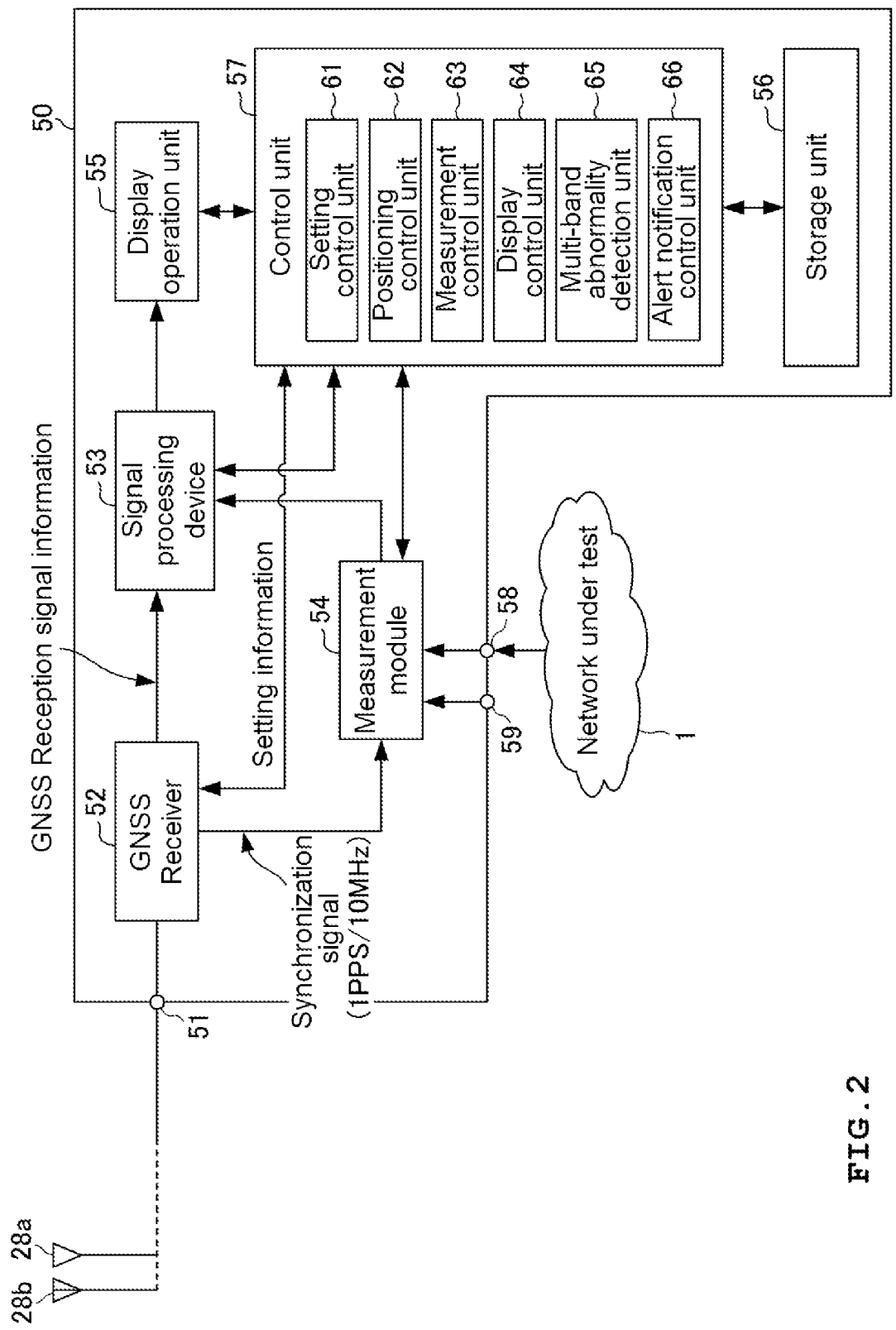
FIG. 2 is a block diagram illustrating a functional configuration of the network measurement device according to the embodiment of the present invention.

FIG. 1 is a conceptual diagram illustrating a configuration of a main part of a 5G network 1 that is a measurement target of a network measurement device 50 according to an embodiment of the present invention. FIG. 2 is a block diagram illustrating a functional configuration of the network measurement device 50 according to the embodiment of the present invention. The network measurement device 50 according to the present embodiment configures the measurement device of the present invention.

As illustrated in FIG. 1, the 5G network 1 is configured by connecting a grandmaster clock 20, a boundary clock 21, and a plurality of base stations 30, 31, and 32 (corresponding to the plurality of apparatuses described above) so as to be communicable via communication means with a predetermined communication standard such as Ethernet (registered trademark). In the 5G network 1, each apparatus such as the grandmaster clock 20, the boundary clock 21, the base stations 30, 31, and 32 can receive satellite information from the GNSS such as a global positioning system (GPS), a QZSS, and a Galileo. Each of these GNSSs can be any GNSS as the information transmission source described above, and each includes GNSS satellites 10a, 10b, and 10c. In FIG. 1, the GNSS satellites 10a, 10b, and 10c are GNSS satellites constituting, for example, a GPS, a QZSS, and a Galileo, respectively, and have a configuration capable of transmitting signals in a plurality of frequency bands (multi-band) with a single (single) GNSS. The present invention is not limited to the 5G network, but the networks illustrated in FIGS. 11A and 11B or an apparatus constituting the network can be defined as a target under test. In this case, the plurality of base stations 30, 31, and 32 are replaced with network apparatuses, data centers in which the base stations are installed, or the like, respectively.

In the 5G network 1 having such a configuration, the grandmaster clock 20 transmits a PTP packet based on time information received from a GNSS satellite 10a constituting a GPS, for example. The boundary clock 21 receives the PTP packet and performs synchronization, and performs time synchronization with the base stations 30, 31, and 32 based on the synchronization. In this way, the 5G network is synchronized by synchronizing each of the base stations 30, 31, and 32 with the grandmaster clock 20.

Figure 11A:
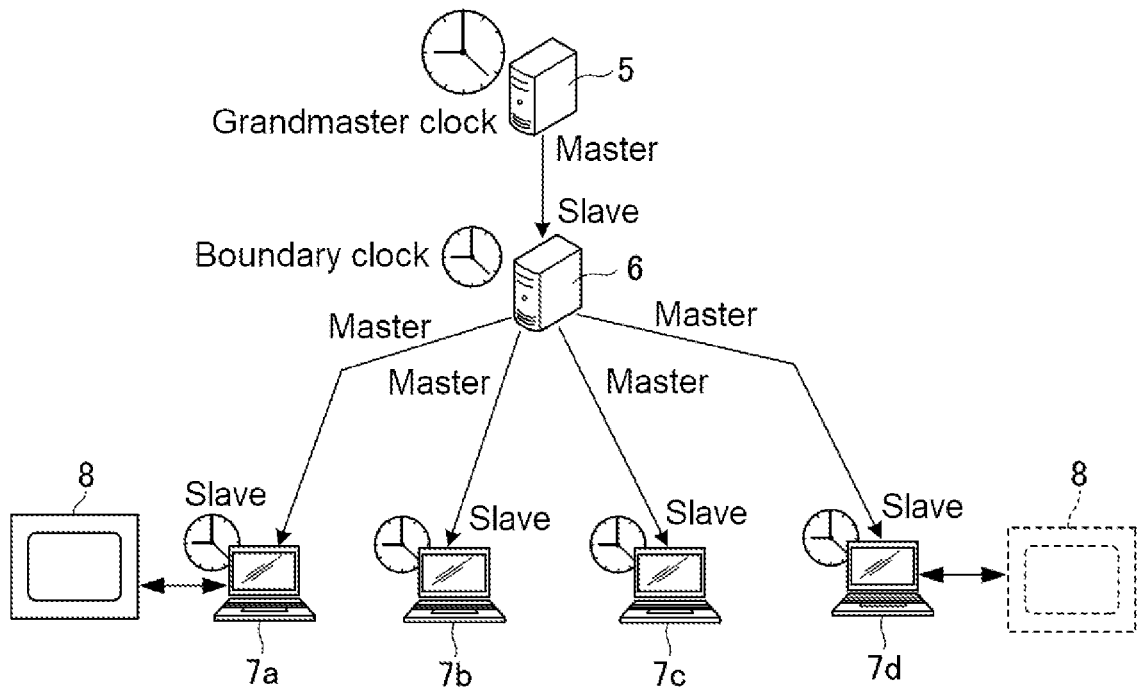
FIGS. 11A and 11B are diagrams illustrating an example of a configuration of a PTP network that is a measurement target of the portable measurement device and a disposition mode of the portable measurement device, where
Figure 11B:
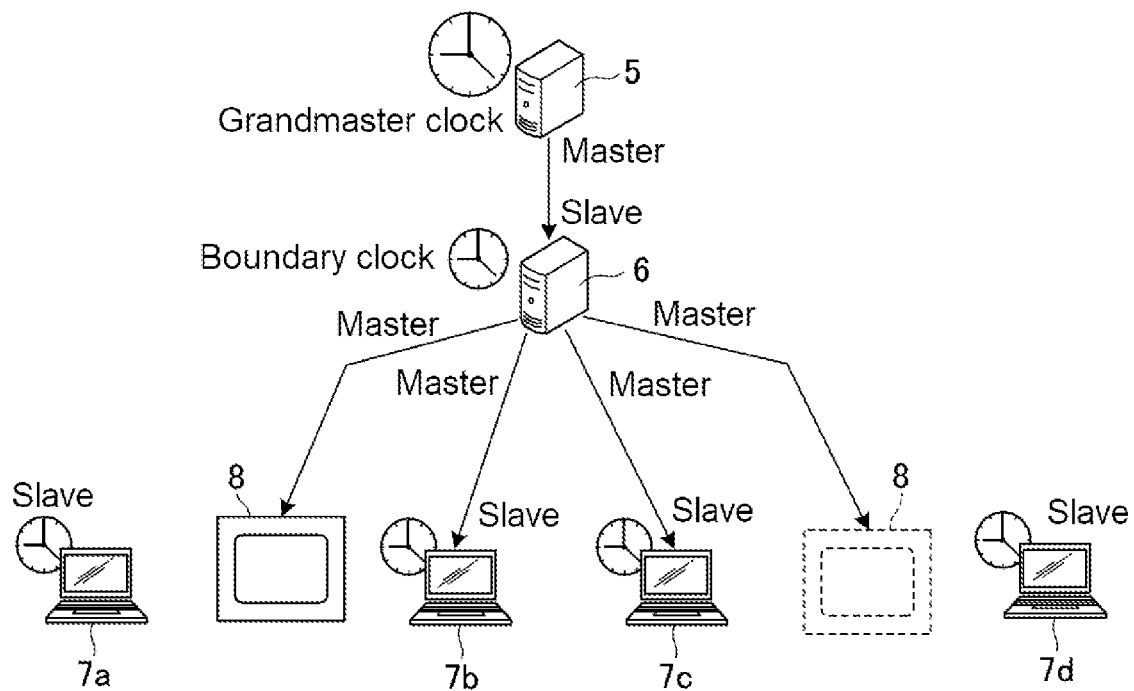

For example, as represented by system configurations illustrated in FIGS. 11A and 11B, the 5G network 1 is realized by a PTP network having a configuration of transferring the PTP packet, which is based on time information acquired from the GNSS (for example, GPS), from a master to a slave, and further transferring the PTP packet from the master when the slave is defined as a master to a plurality of slaves located under the master.

The network measurement device 50 according to the present embodiment is connected to the boundary clock 21, or the base stations 30, 31, and 32 constituting the 5G network 1 illustrated in FIG. 1 as needed and is operated as a communication tester that performs various measurements as to whether or not the 5G network 1 meets the 5G communication standard. Examples of the measurement that targets the 5G network 1 in the network measurement device 50 include time synchronization error measurement (time synchronization error test), for example. The time synchronization error measurement includes the Packet TE measurement and the 1PPS TE measurement.

In the Packet TE measurement, for example, an error of the PTP packet received from the grandmaster clock 20 in the boundary clock 21 is measured (see FIG. 11B). When the Packet TE measurement is performed, it is possible that the network measurement terminal 58 (see FIG. 2) of the network measurement device 50 is connected to an external connection port (not illustrated) of the boundary clock 21, and thereafter, for example, an existing GNSS antenna 28b, which is installed in the vicinity of the boundary clock 21, is connected to the antenna input terminal 51 in place of a portable belonging GNSS antenna 28a that belongs to the network measurement device 50. The existing GNSS antenna 28b referred to in the present invention indicates a reception antenna system including a GNSS antenna main body, a cable, a reception amplifier, a filter, and the like.

The 1PPS TE measurement is, for example, a test for determining whether or not the base stations 30, 31, and 32 are synchronized with the grandmaster clock 20 (see FIG. 11A). When the 1PPS TE measurement is performed, it is necessary that the network measurement device 50 connects any of the base stations 30, 31, and 32 to a 1PPS measurement terminal 59 (see FIG. 2), and connects a portable belonging GNSS antenna 28a that belongs to the network measurement device 50 or an existing GNSS antenna 28b installed in the vicinity of the base stations 30, 31, and 32 to an antenna input terminal 51. In the configuration illustrated in FIG. 1, for the base stations 31 and 32, the existing GNSS antennas 28b may or may not exist beside (vicinity) the base stations 31 and 32 as in the base station 30. The 5G network 1 constitutes the network under test of the present invention, and the boundary clock 21, base stations 30, 31, and 32 constitute the apparatuses of the present invention. Further, the belonging GNSS antenna 28a and the existing GNSS antenna 28b described above constitute the GNSS antenna of the present invention.

The network measurement device 50 is realized by a portable device capable of being moved to a location the Packet TE measurement is performed (a disposition location of the boundary clock 21) or a location where the time synchronization error measurement is performed (disposition locations (test locations) of the base stations 30, 31, and 32), as needed. Hereinafter, the disposition location of the boundary clock 21 and the disposition locations of the base stations 30, 31, and 32 may be referred to as a test location.

As the multi-band among any GNSS composed of the GNSS satellites 10a, 10b, 10c, and the like at the test location of the moving destination, the network measurement device 50 establishes the time synchronization with the transmission source GNSS (for example, signals in different frequency bands of the GNSS satellite 10a) of a plurality of signals (each has different frequency band), set in advance by a user, and then performs the time synchronization error measurement on the boundary clock 21, for example, the Packet TE measurement or the time synchronization error measurement on the base stations 30, 31, and 32, for example, the 1PPS TE measurement. Prior to the start of the Packet TE measurement and the 1PPS TE measurement, the network measurement device 50 sets the location information corresponding to the test location, executes the positioning based on the set location information (positioning start location information), and performs the synchronization control for establishing the synchronization with the above described transmission source GNSS. As the location information, information on latitude, longitude, and altitude corresponding to each of the disposition locations of the boundary clock 21 and the disposition locations (test locations) of the base stations 30, 31, and 32 are set.

The GNSS satellites 10a, 10b, 10c, or the like, which is the acquisition source of the time information used for the above-mentioned synchronization control and the like in the network measurement device 50, constitutes a part of the GNSS that enables calculation of a position or a velocity direction and acquisition of high precision time by receiving radio waves transmitted from a plurality of navigation satellites toward the ground. Here, for example, a GPS can be used as the GNSS that belongs to the GNSS satellite 10a. Further, for example, a GLONASS and a Galileo can be used as the GNSSs that belong to the GNSS satellites 10b and 10c, respectively. Other GNSSs that can be used include a BeiDou, a quasi-zenith satellite system (QZSS), and the like.

In the above time synchronization error measurement, for example, the 1PPS TE measurement, in the network measurement device 50, by the synchronization control mentioned above, for example, when the time, during which the synchronization with the transmission source GNSS of the multi-band is continued, has passed a predetermined time set in advance (synchronization is established), it is determined, for example, whether the network meets the desired stability or synchronization accuracy by comparing reference time information (a reference 1PPS signal) generated based on the time information acquired from the transmission source GNSS at this time, and reference time information under test (a 1PPS signal under test) output based on the time information acquired by the base stations 30, 31, and 32, which are the targets of the time synchronization error measurement, from, for example, the GNSS satellite 10a, which is one transmission source GNSS, via the higher-level apparatuses (the grandmaster clock 20, the boundary clock 21).

In the present embodiment, the network measurement device 50 supports a multi-band method of performing the measurement on the boundary clock 21, and the base stations 30, 31, and 32, which are targets under test, by receiving the signals in the plurality of bands (multi-band) transmitted (provided) from the plurality of GNSS satellites 10a, 10b, and 10c. In order to realize this method, in the configuration of the 5G network 1 illustrated in FIG. 1, with respect to the plurality of GNSS satellites 10a, 10b, and 10c capable of providing signals in the multi-band, the network measurement device 50 is configured to be able to selectively receive any number of bands (multi-band) set in advance among the bands transmitted from the GNSS satellites 10a, 10b, and 10c by operating settings. Here, the GNSS satellites 10a, 10b, and 10c are configured to be capable of transmitting a plurality of bands, for example, and when the above mentioned multi-band is set, one or a plurality of bands can be selectively set among the plurality of bands transmitted from one satellite in the GNSSs (GNSS satellites 10a, 10b, and 10c).

Specifically, in the network measurement device 50, for example, when setting the location information prior to the measurement, a location information setting screen 70 (see FIG. 3) described later can be used to selectively set the single band or the multi-band. When a single band is set, the network measurement device 50 performs processing of calculating position information, time information, and the like by performing the reception processing on a signal in one frequency band (single band) transmitted by the set single GNSS, for example, the GNSS satellite 10a configuring the GPS.

In contrast to this, when a multi-band is set, the network measurement device 50 performs the processing of calculating the position information, the time information, and the like with higher precision than in the single band by receiving each signal in the plurality of frequency bands (multi-band) transmitted from the GNSSs, which transmit signals in the set plurality of bands (frequency bands), for example, the GNSS satellite 10a, which configures the GPS, and using the received signals in the multi-band.

Based on the above schematic description, the configuration of the network measurement device 50 according to the present embodiment will be described in detail with reference to FIGS. 2 and 3.

As illustrated in FIG. 2, the network measurement device 50 according to the present embodiment includes an antenna input terminal 51, a GNSS receiver 52, a signal processing device 53, a measurement module 54, a display operation unit 55, a storage unit 56, a control unit 57, a network measurement terminal 58, and a 1PPS measurement terminal 59.

The antenna input terminal 51 is a terminal for inputting a reception signal obtained by a GNSS antenna for receiving a signal transmitted from the GNSS satellites 10a, 10b, and 10c. The network measurement device 50 has a configuration in which the GNSS antenna is capable of being attached to and detached from the antenna input terminal 51. When the Packet TE measurement is performed, for example, the network measurement device 50 can connect the existing GNSS antenna 28b installed in the vicinity of the boundary clock 21 to the antenna input terminal 51 in place of the belonging GNSS antenna 28a. The network measurement terminal 58 is a terminal used for performing connection with an external connection port (not illustrated) of the boundary clock 21, which is the target under test, for example, when the Packet TE measurement is performed.

Further, when the 1PPS TE measurement is performed, the network measurement device 50 can connect the belonging GNSS antenna 28a that belongs to the network measurement device 50, or the existing GNSS antenna 28b installed in the vicinity of the base stations 30, 31, and 32 of the 5G network 1, to the antenna input terminal 51, respectively. The 1PPS measurement terminal 59 is a terminal used for inputting a signal under test (for example, a 1PPS signal under test or the like) output from, for example, the base stations 30, 31, 32, or the like, which are the targets under test when the 1PPS TE measurement is performed.

in this way, in order to receive the signals (multi-band) transmitted from the GNSS satellites 10a, 10b, and 10c, the antenna input terminal 51 is configured to be capable of connecting the existing GNSS antenna 28b installed in the vicinity of the base stations 30, 31, and 32 and connecting the existing GNSS antenna 28b installed in the vicinity of the boundary clock 21 in place of the belonging GNSS antenna 28a, as well as connecting the belonging GNSS antenna 28a.

The GNSS receiver 52 inputs a signal, which is input from the antenna input terminal 51, received from the existing GNSS antenna 28b, which is connected to the boundary clock 21 or each apparatus of the base stations 30, 31, and 32, or the belonging GNSS antenna 28a, and outputs the signal as the reception signal information from the GNSS satellites 10a, 10b, and 10c to the signal processing device 53 and the measurement module 54. The GNSS receiver 52 has a functional configuration capable of supporting the reception processing on the signals in the plurality of frequency bands (multi-band) that can be transmitted by the plurality of GNSS satellites 10a, 10b, and 10c.

The signal processing device 53 is a function unit that inputs the reception signal information from the GNSS satellites 10a, 10b, and 10c output by the GNSS receiver 52, performs various signal processing based on the reception signal information, and transmits the processing result to the display operation unit 55. Based on the reception signal information, the signal processing device 53 executes, for example, positioning processing of calculating information such as latitude, longitude, and altitude of the location, and outputs each of this information as positioning information. When the multi-band is set by the display operation unit 55, the signal processing device 53 calculates the positioning information by using the signal in each band included in the set multi-band. The signal processing device 53 configures the signal processing unit of the present invention.

The measurement module 54 is a function unit that performs various measurement operations such as the time synchronization error measurement (including the 1PPS measurement and the Packet TE measurement). The measurement module 54 performs the 1PPS TE measurement for comparing phases between a signal (a 1PPS signal under test) fetched from the base stations 30, 31, and 32 of the 5G network 1 and a synchronization signal, which is output from the GNSS receiver 52 based on the reception signal input from the existing GNSS antenna 28b or the belonging GNSS antenna 28a, for example, a reference 1PPS signal. Further, the measurement module 54 performs a comparison of PTP packet time with respect to the reference signal (a reference 10 MHz signal), which is output from the GNSS receiver 52 based on the reception signal information received by the existing GNSS antenna 28b installed in the vicinity of the boundary clock 21, and performs measurements such as one way delay (OWD) and OWD/Packet TE measurement for measuring the Packet TE.

The display operation unit 55 includes a display function, an input operation function, and a touch panel that also serves as a display function and an input operation function. The display function of the display operation unit 55 displays various screens or information such as a location information setting screen 70 (see FIG. 3) and a reception abnormality alert notification message 76 (see FIG. 5), which will be described later. The input operation function of the display operation unit 55 receives various setting operations such as a setting operation for the location information using the location information setting screen 70, or various instruction operations such as an input of an instruction.

The storage unit 56 stores various information such as various control information required to measure the performance of the 5G network 1 and programs to be executed to realize each of the functions of a setting control unit 61, a positioning control unit 62, a measurement control unit 63, a display control unit 64, a multi-band abnormality detection unit 65, and an alert notification control unit 66 in the control unit 57, which will be described later.

The control unit 57 controls the entire network measurement device 50 and includes the setting control unit 61, the positioning control unit 62, the measurement control unit 63, the display control unit 64, the multi-band abnormality detection unit 65, and the alert notification control unit 66.

The setting control unit 61 is a processing function unit that receives a setting operation by the input operation function of the display operation unit 55 and sets various information corresponding to the setting operation. The setting control unit 61 is a function unit that performs various settings related to the Packet TE measurement, the time synchronization error measurement, and the like, in addition to setting processing such as a multi-band and a single band using the location information setting screen 70, for example. The setting control unit 61 configures the multi-band setting means of the present invention.

The positioning control unit 62 is a function unit that performs control for positioning using the location information corresponding to the test location set by using the location information setting screen 70. In the present embodiment, based on the selected (set) positioning start location information, the positioning control unit 62 includes a pattern of executing the positioning at the location (a disposition location of the boundary clock 21) based on the reception signal information received by, for example, the existing GNSS antenna 28b installed in the vicinity of the network measurement device 50 connected to the boundary clock 21, and a pattern of executing the positioning at the location (each of the disposition locations of the base stations 30, 31, and 32) based on the reception signal information received by the existing GNSS antenna 28b, which is installed in the vicinity of the base stations 30, 31, and 32, or the belonging GNSS antenna 28a. The reception signal information received by the existing GNSS antenna 28b at the time of connection to the boundary clock 21 and at the time of connection to the base stations 30, 31, and 32 are collectively referred to as first reception signal information.

The measurement control unit 63 is a function unit that executes various measurements of the 5G network 1 based on the settings in the setting control unit 61, for example, measurement operations such as the 1PPS TE measurement and the OWD/Packet TE measurement.

The display control unit 64 performs control of causing a display function unit of the display operation unit 55 to display various information such as the information set by the setting control unit 61, the positioning information obtained by the positioning control unit 62, and the measurement results based on the measurement control of the measurement control unit 63. Further, the display control unit 64 also performs display control of the above-mentioned location information setting screen 70 (see FIG. 3), reception abnormality alert notification message 76 (see FIG. 5), and the like.

The multi-band abnormality detection unit 65 is a function unit that detects a reception abnormality related to the multi-band based on the reception signal information received by the belonging GNSS antenna 28a and the existing GNSS antenna 28b in a state in which the belonging GNSS antenna 28a or the existing GNSS antenna 28b are directly connected to the antenna input terminal 51. The multi-band abnormality detection unit 65 configures the reception abnormality detection means of the present invention.

The alert notification control unit 66 is a function unit that notifies a user of an alert notification that the reception abnormality occurs when a reception abnormality related to the multi-band is detected. The alert notification control unit 66 configures the alert notification means of the present invention.

Figure 4:
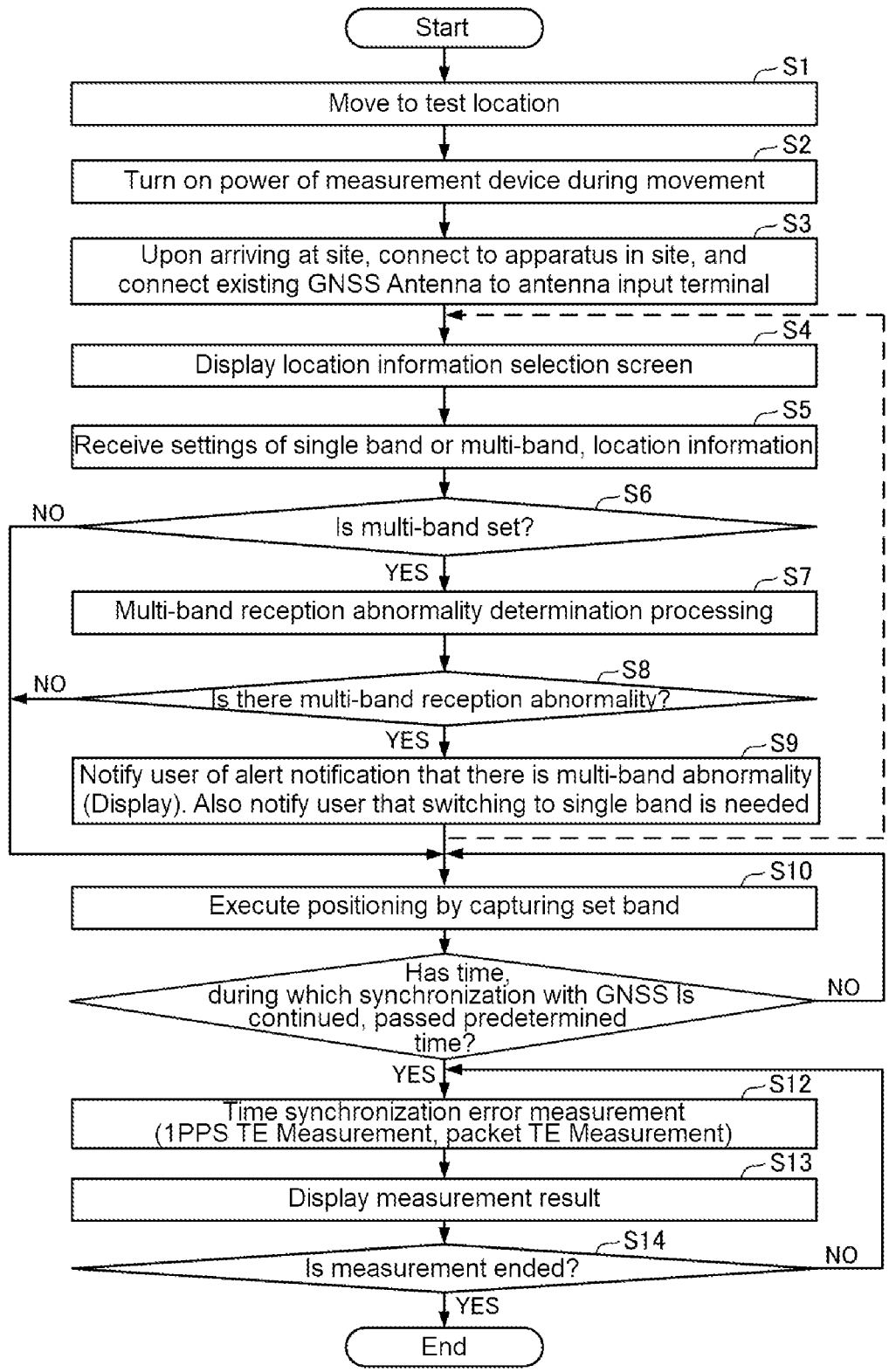
FIG. 4 is a flowchart illustrating a control operation of the time synchronization error measurement of the network measurement device according to the embodiment of the present invention.

Next, a control operation of the time synchronization error measurement in the network measurement device 50 according to the embodiment of the present invention will be described with reference to the flowchart illustrated in FIG. 4. In FIG. 4, a control operation when the Packet TE (OWD/Packet TE) measurement is performed for the boundary clock 21 in the 5G network 1 will be described in particular. Regarding the time synchronization error measurement that targets the 5G network 1, although the detailed operation description is omitted here, the network measurement device 50 according to the present embodiment can also perform the 1PPS TE measurement that targets the base stations 30, 31, and 32.

For the measurement environment of the Packet TE by the network measurement device 50 according to the present embodiment, it is premised that the GNSS such as a GPS, a GLONASS, a Galileo, a BeiDou, and QZSS exists. Each of these GNSSs has a function of transmitting signals in the plurality of frequency bands. In FIG. 1, for example, the measurement environment is specified in which each GNSS of a GPS, a QZSS, and a Galileo exists, and each of the GNSS satellite 10a, which configures the GPS, the GNSS satellite 10b, which configures the QZSS, and the GNSS satellite 10c, which configures the Galileo, transmits signals in the multi-band.

In such a measurement environment, in the network measurement device 50 according to the present embodiment, for example, it is assumed that the single GNSS is set as the transmission source and the reception processing on the multi-band transmitted from the GNSS satellite configuring the GNSS is performed. In particular, in FIG. 4, a control operation when the single GNSS that is the GPS is set as the transmission source, the reception processing on the multi-band transmitted from the GNSS satellite 10a configuring the GPS is performed, and the Packet TE measurement is performed, will be described.

The network measurement device 50 according to the present embodiment is, for example, moved to the disposition location (test location) of the boundary clock 21 in the 5G network 1 illustrated in FIG. 1, connected to the boundary clock 21, and establishes the synchronization with each GNSS (here, GPS) such as a GPS, a GLONASS, a Galileo, a BeiDou, a QZSS, and then performs the Packet TE measurement on the boundary clock 21 based on a satellite signal (multi-band), which is transmitted from the GPS satellites (here, GNSS satellite 10a) configuring the GPS, received by the existing GNSS antenna 28b, and input from the antenna input terminal 51. The present invention is not limited to the 5G network 1, but the networks illustrated in FIGS. 11A and 11B or an apparatus constituting the network can be defined as a target under test. In this case, the boundary clock 21 is replaced with network apparatuses, data centers in which the apparatuses are installed, or the like, respectively.

In order to start the Packet TE measurement, the network measurement device 50 is moved to the test location, for example, the disposition location of the boundary clock 21 (step S1). When a vehicle is used as moving means, for example, it is desirable to turn on the power of the network measurement device 50 during the movement (step S2) and stabilize an operation of a reference frequency transmitter (not illustrated) provided in the GNSS receiver 52 before arriving at the test location.

The reference frequency transmitter outputs the above-mentioned reference 1PPS signal based on the reception signal input from the antenna input terminal 51. The reference frequency transmitter is capable of outputting the reference 1PPS signal for the reception of either single band or multi-band signals supplied from the GNSS satellites (10a, 10b, 10c) that configure the pre-designated GNSS among the above GNSSs.

Upon arriving at the test location (site), the network measurement device 50 is connected to the boundary clock 21 that is a target under test. Specifically, the external connection port of the boundary clock 21 is connected to the network measurement terminal 58 of the network measurement device 50, and the existing GNSS antenna 28b installed in the vicinity of the boundary clock 21, for example, is connected to the antenna input terminal 51 (step S3). As a result, in the network measurement device 50, while the signal transmitted from each of the above GNSSs is received by the existing GNSS antenna 28b and input to the GNSS receiver 52 via the antenna input terminal 51, and the measurement preparation is ready for inputting the signal, which is output from the external connection port of the boundary clock 21, to the measurement module 54 via the network measurement terminal 58.

After that, the network measurement device 50 receives a predetermined location information setting screen call operation in the display operation unit 55, so that the display control unit 64 causes the display operation unit 55 to display the location information setting screen 70 (step S4).

Figure 3:
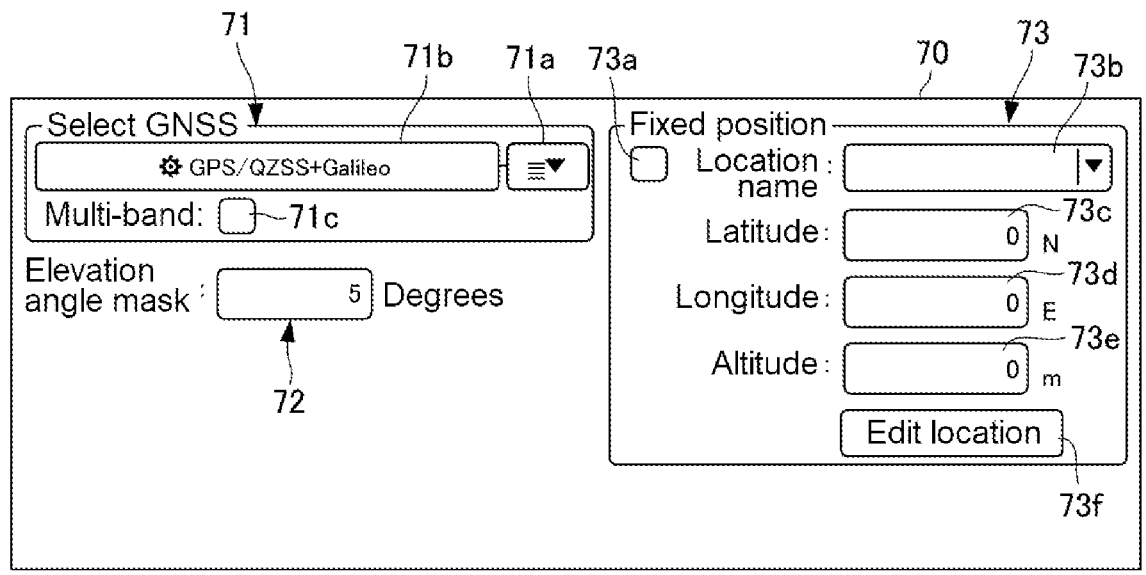
FIG. 3 is a diagram illustrating a configuration example of a location information setting screen related to the time synchronization error measurement of the network measurement device according to the embodiment of the present invention.

As illustrated in FIG. 3, for example, the location information setting screen 70 includes a GNSS selection tool 71, an elevation angle designation tool 72, and a fixed position designation tool 73. The GNSS selection tool 71 is configured to be capable of selecting a desired GNSS type while scrolling and displaying the GNSS type field 71b in response to the operation of a scroll button 71a. As the GNSS selection tool 71, a multi-band selection tool 71c is further provided in which a multi-band can be selected as needed. The multi-band selection tool 71c is configured such that a multi-band can be selected by checking a check field, and a single band can be selected by unchecking the check field.

The elevation angle designation tool 72 is configured to designate the elevation angle of the GNSS antenna (the belonging GNSS antenna 28a, the existing GNSS antenna 28b, or the like) connected to the antenna input terminal 51, numerically.

The fixed position designation tool 73 is a tool for designating a fixed position of the test location and is configured with disposing a scroll field 73b, a latitude field 73c, a longitude field 73d, an altitude field 73e, and an edit button 73f in association with a location name designation tool 73a. In the fixed position designation tool 73, the location information corresponding to a location name (identification information for identifying the location) can be directly input (set) by checking the location name designation tool 73a, scrolling in the scroll field 73b to select the location name, and inputting appropriate values in the latitude field 73c, the longitude field 73d, and the altitude field 73e, respectively. The edit button 73f is a function button for instructing the editing of the location information set as described above.

After the location information setting screen 70 is displayed in step S4 above, the setting control unit 61 receives settings such as a GNSS type, a band type (multi-band or single band), an elevation angle of the GNSS antenna connected to the antenna input terminal 51, a location name, and location information on the corresponding location information setting screen 70 (step S5). The location information setting screen 70 illustrated in FIG. 3 is an example when a combination of the GPS, QZSS, and Galileo, that is, a multi-GNSS is set as the GNSS type. In the flowchart of FIG. 4, for example, in the location information setting screen 70 when performing the reception processing on the multi-band that targets the GPS single satellite information, the GPS is received as the GNSS type, and multi-band input (set) is received as the band type.

When the reception of the setting is completed, the positioning control unit 62 checks whether or not the set band type is multi-band (step S6). When it is detected that the set band type here is a single band (NO in step S6), the process is controlled to move to step S10.

In contrast to this, next, when it is detected that the set band type is the multi-band (YES in step S6), the multi-band abnormality detection unit 65 executes processing for multi-band reception abnormality determination that targets the satellite signals (multi-band), which are transmitted from the GNSS satellite 10a configuring the GPS, received by the existing GNSS antenna 28b, and input from the antenna input terminal 51 via the external connection port (step S7), and further determines whether or not a multi-band reception abnormality occurs based on the processing result (step S8). The processing for the multi-band reception abnormality determination performed in step S7 corresponds to, for example, the processing of obtaining a value and a state of each item such as <the number of captured multi-bands>, <a level difference between bands>, <a pseudo distance of each satellite based on a GNSS reception value>, and <an abnormality of a GNSS reception antenna system> described later. In step S8, it is determined whether or not a multi-band reception abnormality occurs according to the value and state of each of the above items.

The multi-band abnormality detection unit 65 uses the GPS set in step S5 as the transmission source, and the process is controlled to move to step S10 when it is detected that the multi-band signal, which is transmitted from the GNSS satellite 10a configuring the corresponding GPS, is received normally (for example, received the set number of multi-bands) (NO in step S8).

In contrast to this, when the multi-band abnormality detection unit 65 detects that the multi-band signal is not normally received (multi-band reception abnormality occurs) (YES in step S8), the alert notification control unit 66 notifies the user of an alert notification that the multi-band reception is abnormal (step S9). The alert notification in step S9 can be performed, for example, by using a method such as causing the display operation unit 55 to display the reception abnormality alert notification message 76 (see FIG. 5), or sounding an alert sound.

Further, in step S9, regarding the above settings by the setting control unit 60, along with the display or sound alert notification, the alert notification control unit 66 may also notify the user that the user is prompted to switch the setting from the setting for performing the reception processing on the multi-band to the setting for performing the reception processing on the single band (hereafter, simply referred to as "switching from the multi-band to the single band").

When a notification that the user is prompted to switch the setting from the multi-band to the single band is performed, for example, the user can return to step S4, display the location information setting screen 70 again in step S5, and perform the setting change from the multi-band to the single band. When a decrease in measurement precision is allowed, the multi-band measurement operation may be continued (moved to step S10) as it is while receiving the alert notification of the multi-band reception abnormality in step S9.

In a case where the notification was sent that the user is prompted to switch the setting from the multi-band to the single band in step S9, and the user switched the setting to the single band, when it is detected that the set band type is not multi-band in step S6 during the subsequent processing (NO in step S6), the process is controlled to move to step S10.

When the process is moved to step S10, the positioning control unit 62 drives and controls the GNSS receiver 52 and the signal processing device 53 so as to capture the band (single band or multi-band) that uses the GNSS satellite 10a configuring the GPS set in step S5 as the transmission source and execute the positioning (step S10). When the positioning is performed, the setting control unit 61 sets the location information for which the setting is received in step S5 to the GNSS receiver 52 as the positioning information of the network measurement device 50 at that time.

When the single band is set in step S5, the signal processing device 53 receives the signal in the frequency band corresponding to the single band from the single GNSS (for example, the GPS), which is the transmission source of the signal in the single band in each GNSS, and calculates the position information and the time information. Further, when the multi-band is set in step S5, the signal processing device 53 receives a plurality of signals in each frequency band corresponding to the multi-band from the GNSS satellite 10a configuring the GPS, which is the transmission source of each band in the multi-band and calculates the position information and the time information.

When the positioning is being performed in step S10, the positioning control unit 62 determines whether or not the time, during which the synchronization with the transmission source GNSS (GPS) is continued, has passed a predetermined time set in advance (whether or not enough time has passed since the synchronization is established), based on the position information obtained by performing the positioning based on the signal in the single band or the multi-band received from the transmission source GNSS (GPS), and the above-mentioned set positioning information (the location information) (step S11).

When it is determined that the predetermined time has not passed (NO in step S11), the synchronization control is repeatedly executed by continuing the processes after step S10, and meanwhile when it is determined that the predetermined time has passed (YES in step S11), time synchronization error measurement processing is executed (step S12). The time synchronization error measurement includes the 1PPS TE measurement and the Packet TE measurement. In this example, the Packet TE measurement is executed, for example, as the time synchronization error measurement processing.

When the time synchronization error measurement, for example, the Packet TE measurement is started in the network measurement device 50, the measurement control unit 63 controls such that the signal in the single band or multi-band, which is received from the transmission source GNSS (GPS) by the existing GNSS antenna 28b and input to the antenna input terminal 51, is input to the GNSS receiver 52. On the other hand, the measurement control unit 63 fetches the PTP packet input from the network measurement terminal 58 and controls such that the PTP packet is input to the measurement module 54.

The measurement module 54 performs the Packet TE measurement for measuring an error in a PTP packet received from the grandmaster clock 20 based on the signal input from the GNSS receiver 52 (the input signal from the antenna input terminal 51) and the signal (the PTP packet) input from the network measurement terminal 58 as a comparison target.

Figure 9:
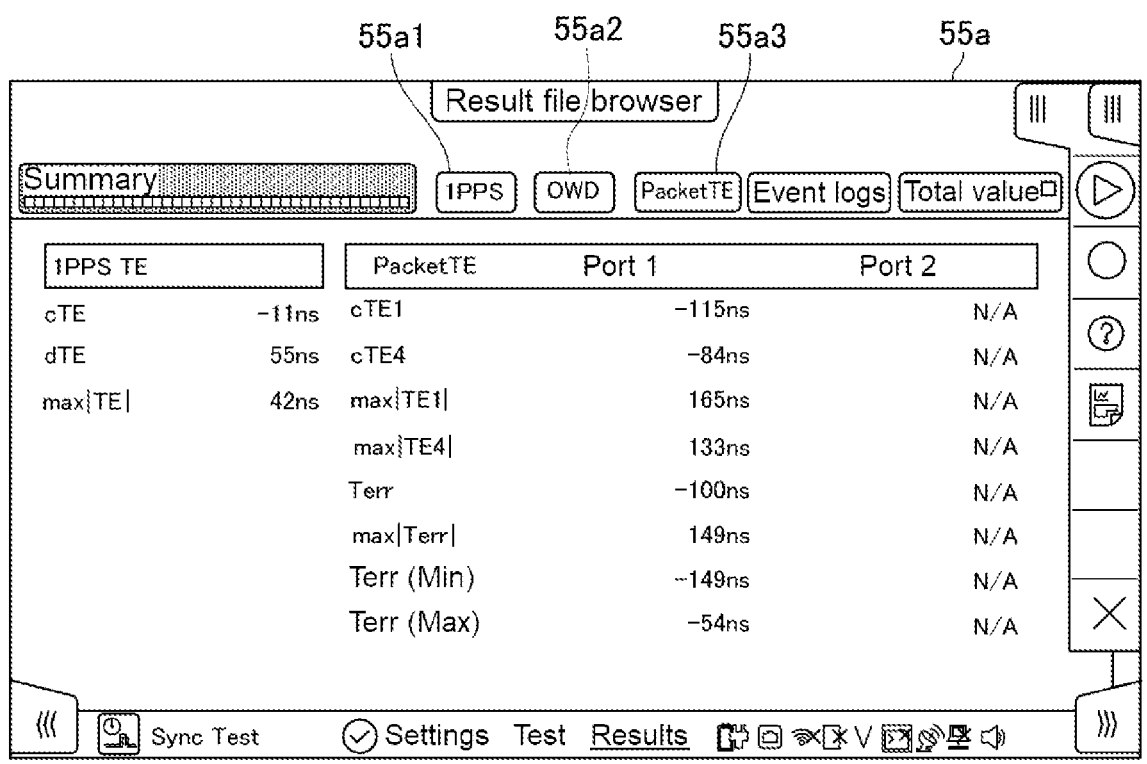
FIG. 9 is a diagram illustrating a configuration example of a test result display screen for the time synchronization error measurement of the network measurement device according to the embodiment of the present invention.

When the Packet TE measurement is ended in step S12, the display control unit 64 controls the display operation unit 55 to display a test result display screen 55a showing the test results up to that point (step S13). An example of the test result display screen 55a is illustrated in FIG. 9. The test result display screen 55a displays an example of displaying the test result when the 1PPS TE measurement is performed together with the Packet TE measurement described above in step S12. As illustrated in FIG. 9, a summary of the time synchronization error measurement is displayed on the test result display screen 55a. It is possible to shift to a test result screen specialized for each item by a predetermined operation from a displayed test result display screen 55a.

During the execution of the screen transition described above, the measurement control unit 63 checks whether or not the display operation unit 55 receives a measurement end operation (step S14). When it is determined that the measurement end operation is not received (NO in step S14), the processes after step S12 are continued. When it is determined that the measurement end operation is received meanwhile (YES in step S14), the series of time synchronization error measurement processing described above is ended.

Next, a specific example of the alert notification of the multi-band reception abnormality in step S9 of FIG. 4 will be described. In the present embodiment, for example, abnormality detection and alert notification focusing on the following four typical items are assumed.

<Number of Captured Multi-Bands>

This is a method in which when the multi-band is set (see step S5 in FIG. 4), as the processing for the multi-band reception abnormality determination in step S7 of FIG. 4, a control to capture the signal corresponding to the multi-band transmitted from the transmission source GNSS (for example, GPS) is performed, it is determined that there is the reception abnormality in multi-band when the number of multi-bands captured when the control is performed is less than the set number of multi-bands, and the alert is notified.

When this method is applied, for example, the multi-band abnormality detection unit 65 needs to include a multi-band number detection function of detecting whether or not the captured number of bands reaches the set number of bands. That is, when this method is applied, the multi-band abnormality detection unit 65 configures the capturing means of the present invention.

In the network measurement device 50 including the multi-band abnormality detection unit 65 having such a configuration, the multi-band number detection function checks, for example, whether or not the number of multi-bands captured in step S7 reaches the set number of multi-bands in step S8 of FIG. 4. When the alert notification control unit 66 detects that the number of captured multi-bands does not reach the set number of multi-bands (the number of captured multi-bands is less than the set number of multi-bands), the alert notification control unit 66 notifies the user that the multi-band is not possible.

Figure 5:
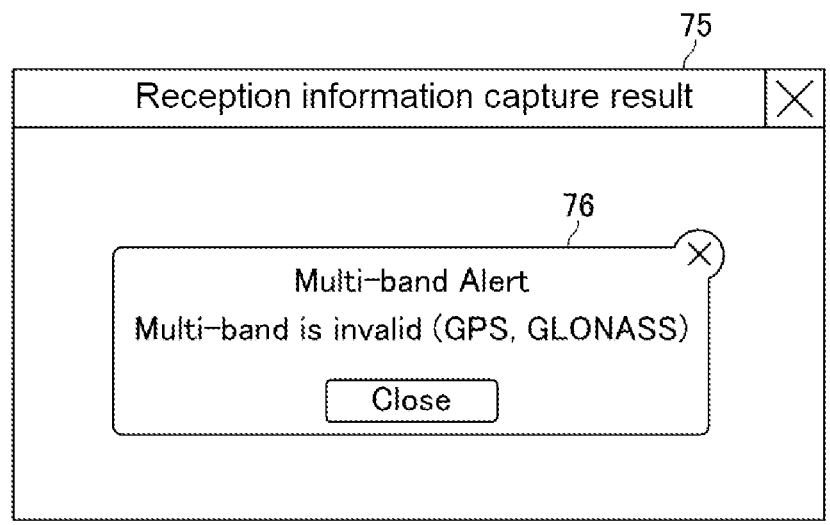
FIG. 5 is a diagram illustrating an example of a display of a multi-band reception abnormality alert notification message used in multi-band reception abnormality alert notification processing in step S9 of FIG. 4.

As a specific example of the alarm notification, FIG. 5 illustrates an example in which a reception abnormality alert notification message 76 is displayed using the reception information capture result screen 75. The reception abnormality alert notification message 76 displayed here has, for example, the content of "Multi-band Alert: Multi-band is invalid (GPS, GLONASS)". In the reception abnormality alert notification message 76, for example, the GNSS in which only one band is captured is displayed in parentheses by checking a state of two bands of each GNSS. The reception abnormality alert notification message 76 corresponds to the alert notification message of the present invention. The reception information capture result screen 75 illustrated in FIG. 5 is an example when the GPS and the GLONASS are set as the transmission sources of the multi-band. As assumed in FIG. 4, on the reception information capture result screen 75 when the single GNSS (GPS) is set as the transmission source of the multi-band, the GPS is displayed as the GNSS that captures only the number of bands that does not meet the set number of multi-bands.

In the portable network measurement device 50 to which this method is applied, for example, in a case where the user selects and sets the multi-band reception in the GNSS (GPS) and checks the reception abnormality alert notification message 76 described above, and when fewer bands are captured than desired, the user can clearly know the fact. Therefore, even when the user subsequently continues the measurement without switching to the single band, the user can perform the measurement in a situation where a decrease in the accuracy and precision of the synchronization error measurement on the 5G network 1 is allowed. Further, according to this network measurement device 50, it is possible to improve the accuracy and precision of the synchronization error measurement by taking some measures that enable multi-band reception in the environment used by the user, and it is possible to improve the reliability of determination as to whether or not the 5G network 1 meets the communication standard.

<Level Difference Between Bands>

This is an example of a case where the user is notified of an alert when the signal quality (satellite information) acquired from the GNSS satellite (the same, GNSS satellite 10a) configuring the GNSS (for example, GPS) is different from an expected value, and a level difference between the bands is used as an item of the expected value. Specifically, this is a method in which when the multi-band is set (see step S5 in FIG. 4), and in the processing for the multi-band reception abnormality determination in step S7 in FIG. 4, the level difference between the signals in each band is further checked in a situation where the signals in all the bands are captured, a state in which the level difference exceeds a predetermined value set in advance is determined as the reception abnormality in multi-band, and the user is notified of an alert.

When this method is applied, for example, the multi-band abnormality detection unit 65 needs to include level difference detection means for detecting whether or not the level difference between the signals in each band of the multi-band exceeds the predetermined value.

In the network measurement device 50 including the multi-band abnormality detection unit 65 including such a configuration, the level difference detection means detects the level difference between the signals in each band set as the multi-band. The alert notification control unit 66 may be configured to notify the user that there is an abnormality when it is detected that the level difference between the signals in each band detected by the level difference detection means exceeds the predetermined value.

<Pseudo Distance of Each Satellite Based on GNSS Reception Value>

This is another example of a case where the user is notified of an alert when a signal (satellite information) acquired from the GNSS (for example, GPS) is different from the expected value, and a pseudo distance of each satellite based on a GNSS reception value is used as an item of the expected value. Specifically, when the multi-band is set (see step S5 in FIG. 4), and in the processing for the multi-band reception abnormality determination in step S7 of FIG. 4, the pseudo distance information on each satellite is calculated based on the information acquired from the two signals in a situation where the signals in the two bands, which are being set, are captured, for example. This is a method in which when the comparison result of the pseudo distance information between each of the satellites, which are the transmission sources of the two signals, shows a result different from the usual one, it is determined that there is a reception abnormality in multi-band and the user is notified of an alert.

When this method is applied, for example, the multi-band abnormality detection unit 65 needs to include calculation means for calculating pseudo distance information between each of the satellites, which are the transmission sources of signals in two bands, and comparison means for comparing the pseudo distance information between each of the satellites which are the transmission sources of the calculated signals in the two bands.

In the network measurement device 50 including the multi-band abnormality detection unit 65 having such a configuration, the above calculation means calculates the pseudo distance information between each of the satellites, which are the transmission sources of the signals in two bands, and the comparison means performs processing of comparing the pseudo distance information between each of the satellites which are the transmission sources of the calculated signals in the two bands.

Figure 6:
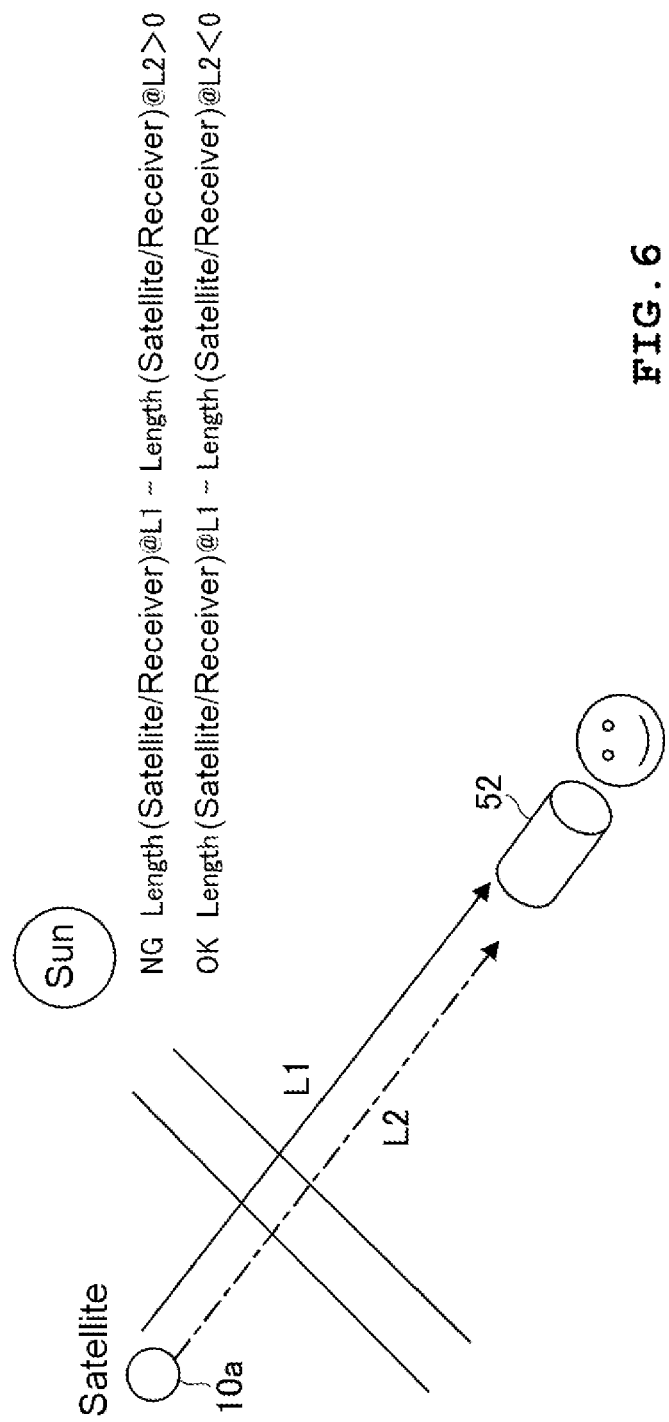
FIG. 6 is a schematic diagram illustrating a calculation procedure and multi-band reception abnormality determination procedure of pseudo distance information on signals in two bands in the network measurement device according to the embodiment of the present invention.

To give a specific example, for example, in the example illustrated in FIG. 6, first, a pseudo distance Length (satellite/receiver)@L1 of the signal L1 (indicated by a solid line) having a component of the first frequency band and a pseudo distance Length (satellite/receiver)@L2 of the signal L2 (indicated by a dotted line) having a component of the second frequency band transmitted from the same satellite (among the GNSS in FIG. 1, for example, the GNSS satellite 10a configuring the GPS), are calculated. The Length (satellite/receiver) refers to a distance between the satellite and the receiver (for example, the GNSS receiver 52). Next, the comparison means calculates a difference in pseudo distance (comparison result) between the signals L1 and L2 by using the following equation based on the pseudo distance Length (satellite/receiver)@L1 distance of the first signal L1 and the pseudo distance Length (satellite/receiver)@L2 of the second signal L2, and determines whether the calculated difference in pseudo distance is positive or negative. However, the frequency band of the signal L1 has a component of a frequency band higher than the frequency band of the signal L2. Normally, the propagation delay time is longer in the lower frequency band due to the influence of the ionosphere and the like.

$$\text{Difference in pseudo distance} = \text{Length (satellite/receiver)}@L1 - \text{Length (satellite/receiver)}@L2 \quad (1)$$

On top of that, when the difference in pseudo distance (comparison result) related to the equation (1) by the comparison means is negative, that is, when Length (satellite/receiver)@L1−Length (satellite/receiver)@L2<0 is satisfied, the alert notification control unit 66 determines that the condition is normal, and no abnormal notification is given.

In contrast to this, when the difference in pseudo distance (comparison result) related to the equation (1) by the comparison means is positive, that is, when Length (satellite/receiver)@L1−Length (satellite/receiver)@L2>0 is satisfied, the alert notification control unit 66 notifies the user that there is an abnormality.

Of the signal quality, the present example describes the amount of delay between a plurality of signals.

<Abnormality in GNSS Reception Antenna System>

This is a method in which in the processing for the multi-band reception abnormality determination in step S7 of FIG. 4, an abnormality in the GNSS reception antenna system connected to the outside of the present measurement device (network measurement device 1) is detected, and in a case where the multi-band is set (see step S5 in FIG. 4), it is determined that there is a reception abnormality in multi-band when the number of captured bands is insufficient or when the signal quality of each band is not satisfied or the like, and then the user is notified of an alert.

In the network measurement device 50 including the multi-band abnormality detection unit 65 having such a configuration, at the timing after step S3 in FIG. 4, for example, when the multi-band abnormality detection unit 65 detects that the number of captured bands is insufficient, the signal quality of each band deteriorates, or the like, the alert notification control unit 66 may be configured such that the user is notified that there is an abnormality (an abnormality in the GNSS reception antenna system). As a result, the user can recognize an abnormality in the reception antenna system including a GNSS antenna main body, a cable, a reception amplifier, a filter, or the like configuring the existing GNSS antenna 28b.

Next, the measurement processing (OWD/Packet TE measurement) in step S12 of FIG. 4 and the measurement result display processing in step S13 will be described with reference to FIGS. 7 to 10.

Figure 7:
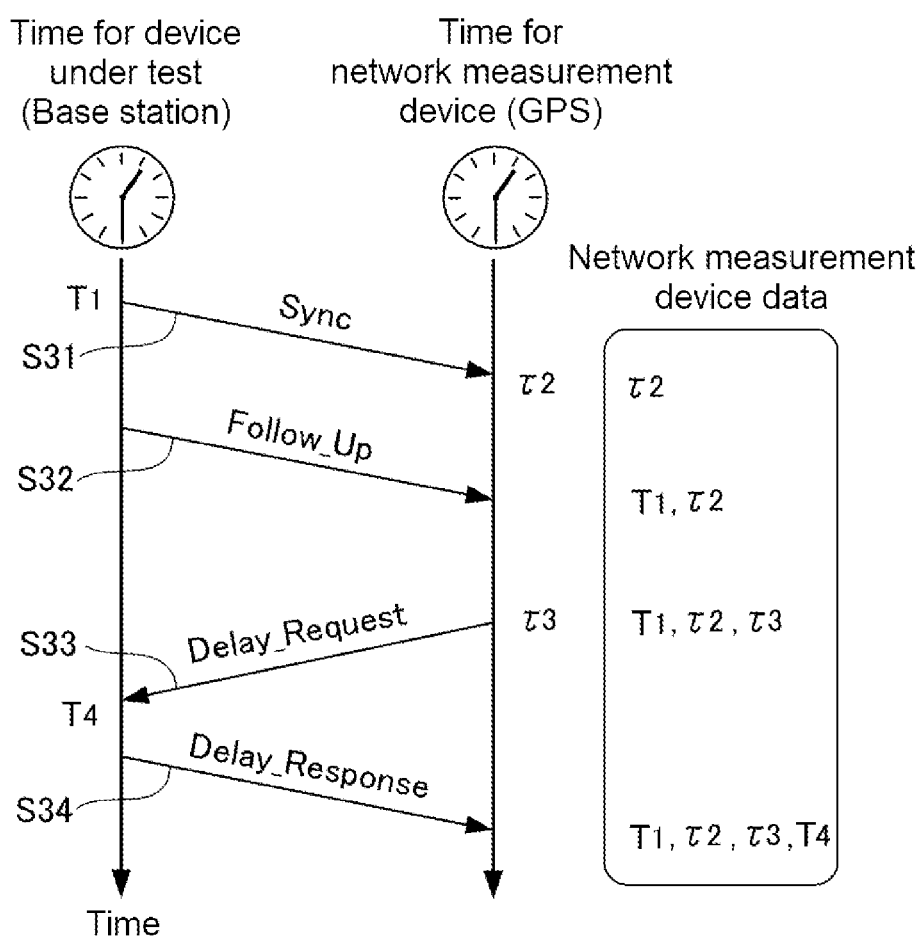
FIG. 7 is a diagram illustrating a control procedure related to OWD/Packet TE measurement of the network measurement device according to the embodiment of the present invention.

In the OWD/Packet TE measurement performed in step S12 of FIG. 4, for example, it can be performed according to the control procedure illustrated in FIG. 7. First, in step S31, a device under test (base stations 30, 31, and 32) transmits a sync message to the network measurement device 50. T1 is defined as a time stamp of the device under test when the sync message is transmitted. When a follow up message (see step S32) is not used, T1 is notified to a slave clock with the sync message. τ2 is defined as a time stamp of the network measurement device 50 when the network measurement device 50 receives the sync message.

When the device under test transmits a follow up message in step S32, T1 is notified to the network measurement device with the follow up message.

In step S33, the network measurement device 50 transmits a delay request message to the device under test. τ3 is defined as a time stamp of the network measurement device when the delay request message is transmitted. T4 is defined as a time stamp of the device under test when the device under test receives the delay request message.

In step S34, the device under test transmits a delay request message to the network measurement device 50 and notifies the network measurement device 50 of T4.

The network measurement device 50 can calculate the OWD and the Packet TE based on the data obtained in the above procedure. As an example, the sync OWD can be obtained by using a formula (τ2−T1), and the delay request OWD can be obtained by using a formula (T4−τ3).

Figure 8:
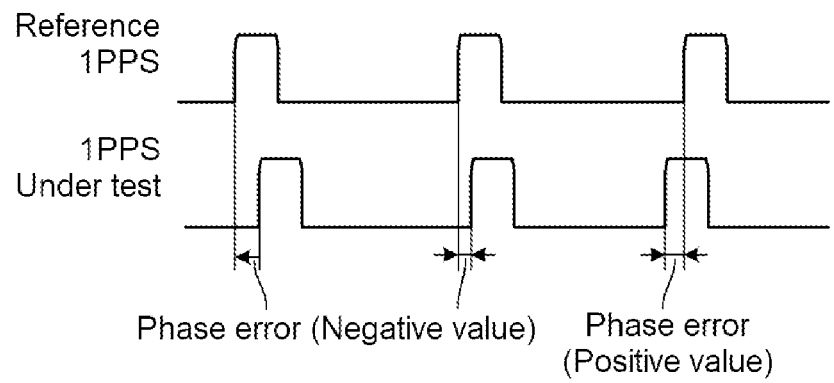
FIG. 8 is a timing chart for describing a definition of a phase error related to 1PPS measurement in the time synchronization error measurement of a network measurement device according to the embodiment of the present invention.

In the measurement processing performed in step S12 of FIG. 4, in addition to the above-mentioned OWD/Packet TE measurement, the time synchronization error measurement (1PPS measurement) can also be performed. In the 1PPS measurement, a phase comparison is performed on the 1PPS signal under test with respect to the reference 1PPS signal, and the phase error, deviation, and filter TE of both signals are measured. As illustrated in FIG. 8, the phase error corresponds to, for example, a time difference of the 1PPS signal under test with respect to the reference 1PPS signal. When the reference 1PPS signal is ahead of the 1PPS signal under test, a value is negative, and when the 1PPS signal under test is ahead of the reference 1PPS signal, the value is positive.

In step S13 of FIG. 4, the measurement results of the above-mentioned OWD/Packet TE measurement (see step S12 of FIG. 4) and the 1PPS measurement are displayed using, for example, a test result display screen 55a illustrated in FIG. 9. A summary of the time synchronization error measurement is displayed on the test result display screen 55a. Among the information configuring the summary, TE indicates the phase error (time difference) between the reference 1PPS signal and the 1PPS signal under test, and has, for example, a type such as a constant time error (cTE), a dynamic time error (dTE), a max|TE|. Where cTE indicates an average value of the phase error (see FIG. 10A). dTE indicates an amount of deviation from the average value of the filter TE (see FIG. 10B). max|TE| indicates the maximum value of the phase error expressed as an absolute value. The test result display screen 55a includes a 1PPS button 55a1, an OWD button 55a2, and a Packet TE button 55a3, and by pressing the 1PPS button 55a1, the OWD button 55a2, and the Packet TE button 55a3, it is possible to switch to the display of detailed measurement results related to the 1PPS, OWD, and packet TE, respectively.

In FIG. 4, in the network measurement device 50, the control operation of the Packet TE measurement has been described by taking as an example a case where the single GNSS (for example, the GPS) is set as the transmission source and the reception processing on the multi-band transmitted from the GNSS satellites (for example, the GNSS satellite 10a) configuring the GNSS is performed.

It is needless to say that the Packet TE measurement can be performed in the same manner (see FIG. 4) in both the case where the single GNSS that is the QZSS is set as the transmission source and the reception processing of the multi-band transmitted from the GNSS satellite 10b is performed and the case where the single GNSS that is the Galileo is set as the transmission source and the reception processing of the multi-band transmitted from the GNSS satellite 10c is performed.

Further, the network measurement device 50 according to the present embodiment is configured such that in an environment where the GNSS such as a GPS, a GLONASS, a Galileo, a BeiDou, and a QZSS described above are adopted as a multi-GNSS, any plurality of GNSSs in the multi-GNSS is combined and set as the transmission source of the multi-band, the reception processing of the multi-band transmitted from each GNSS satellite configuring the plurality of GNSSs is performed, and the Packet TE measurement can be performed.

In this case, the user needs to set a combination of the plurality of GNSSs to be the transmission source by using the location information setting screen 70. For example, the scroll mode of the GNSS type field 71b on the location information setting screen 70 when setting the combination of the GPS and the QZSS and the Galileo is, for example, the mode illustrated in FIG. 3.

As described above, the present embodiment describes that a multi-band reception abnormality is detected during the reception processing on the multi-band and the user is notified of an alert notification about the occurrence of the abnormality, and a configuration is included which is capable of supporting the reception operation of receiving the multi-band from any of the plurality of GNSSs in the multi-GNSS, as well as is capable of supporting the reception operation of receiving the multi-band from the single GNSS.

As explained above, the network measurement device 50 according to the present embodiment is a portable measurement device that is moved to each of disposition locations of each apparatus such as a plurality of base stations 30, 31, and 32, or a boundary clock 21, is connected to any of the apparatuses of the moving destination, and then performs reception processing on desired signals in a plurality of frequency bands, among any signals in the plurality of frequency bands, which are different from each other, transmitted from GNSS satellites 10a, 10b, and 10c configuring any GNSS, as the multi-band, and then measures the apparatus of a moving destination based on information on a position or time acquired by the reception processing.

The network measurement device 50 is configured to include an antenna input terminal 51 capable of connecting a GNSS antenna that receives signals transmitted from the GNSS satellites 10a, 10b, and 10c configuring any GNSS, that is, a belonging GNSS antenna 28a that belongs to the network measurement device 50, and an existing GNSS antennas 28b that is installed in the vicinity of each of the base stations 30, 31, and 32, and the boundary clock 21, a setting control unit 61 that selectively sets the GNSS (composed of the GNSS satellites 10a, 10b, and 10c), which is a transmission source of the signals in the plurality of frequency bands corresponding to the multi-band, a multi-band abnormality detection unit 65 that detects a reception abnormality in signals in the plurality of frequency bands corresponding to the multi-band based on the GNSS antenna receiving the signal (multi-band) transmitted from the GNSS, which is the transmission source, and reception signal information obtained by the reception processing in a state in which the measurement device is connected to any of the apparatuses of the moving destination and the GNSS antenna (the belonging GNSS antenna 28a or the existing GNSS antenna 28b) is connected to the antenna input terminal 51, and an alert notification control unit 66 that notifies a user of an alert notification that a multi-band reception abnormality occurs when the reception abnormality in signals in the plurality of frequency bands corresponding to the multi-band is detected.

With this configuration, the network measurement device 50 according to the present embodiment can quickly handle resetting or the like by receiving the alert notification that the multi-band reception abnormality occurs in a case where the measurement is performed on the apparatus under test at locations different from each other when the desired multi-band cannot be normally received from any GNSS set as the transmission source. Therefore, the adoption of low precision measurement results is prevented in advance, and high precision measurement can be possible by taking an action to handle the reception abnormality. Further, the user can recognize an abnormality in the reception antenna system including a GNSS antenna main body, a cable, a reception amplifier, a filter, or the like configuring the existing GNSS antenna 28b.

In the network measurement device 50 according to the present embodiment, the antenna input terminal 51 is capable of connecting the existing GNSS antenna 28b among the plurality of apparatuses in place of the belonging GNSS antenna 28a that belongs to the network measurement device 50, and after the existing GNSS antenna 28b is connected to the antenna input terminal 51, the measurement is performed based on the existing GNSS antenna 28b receiving the signal transmitted from the GNSS, which is the transmission source, and the reception signal information obtained by the reception processing.

With this configuration, in the network measurement device 50 according to the present embodiment, since the measurement can be performed based on the reception signal information on the signals in the plurality of frequency bands corresponding to the multi-band, the user can be notified of the occurrence of the multi-band reception abnormality, and it is possible to check whether or not the antenna is compatible with the multi-band even with the existing GNSS antenna 28b, for which multi-band support is uncertain, is used in place of the belonging GNSS antenna 28a, for which multi-band support is certain, provided by the measurement device manufacturer, and the high precision measurement can be performed by taking action to dispose and connect the supporting antenna for antennas that do not support multi-band.

Further, in the network measurement device 50 according to the present embodiment, along with the alert notification, the alert notification control unit 66 is configured to notify the user that the user is prompted to switch a setting of the GNSS, which is the transmission source, from a setting for performing the reception processing on the multi-band to a setting for performing the reception processing on a single band that is a signal in one frequency band.

With this configuration, the network measurement device 50 according to the present embodiment can avoid the situation where measurement becomes impossible and continue the measurement by switching to the single band setting even when the desired multi-band cannot be normally received.

Further, in the network measurement device 50 according to the present embodiment, the alert notification control unit 66 is configured to notify the user of the alert notification by at least one of displaying the reception abnormality alert notification message 76 or sounding an alert sound.

With this configuration, the network measurement device 50 according to the present embodiment can reliably notify the user of the multi-band reception abnormality by displaying a reception abnormality alert notification message 76 or sounding an alert sound, and maintain the recognition of the alert notification.

Further, in the network measurement device 50 according to the present embodiment, the multi-band abnormality detection unit 65 is configured to include capturing means for using signals in the plurality of frequency bands corresponding to the multi-band as targets, capturing the signal transmitted from the GNSS, which is the transmission source, and determining whether or not a signal quality of the captured signal meets a predetermined signal quality of the signals in the plurality of frequency bands corresponding to the set multi-band, and the alert notification control unit 66 is configured to notify the user that multi-band reception is not possible when the signal quality of the signal captured by the capturing means does not meet the predetermined signal quality.

With this configuration, in the network measurement device 50 according to the present embodiment, when the signal quality of the captured signal does not meet the predetermined signal quality of the signals in the plurality of frequency bands corresponding to the set multi-band, the user can surely recognize that the multi-band reception is impossible and can take quick measures.

Further, in the network measurement device 50 according to the present embodiment, the capturing means of the multi-band abnormality detection unit 65 is configured to include level difference detection means for detecting a level difference between signals in the plurality of frequency bands corresponding to the multi-band, and the alert notification control unit 66 is configured to notify the user that there is an abnormality when the level difference detected by the level difference detection means exceeds a predetermined value set in advance.

With this configuration, in the network measurement device 50 according to the present embodiment, the user can reliably recognize the abnormality in the antenna system receiving the multi-band that causes the fact (the use of antennas that do not support the multi-band) that the level difference between the signals in the plurality of frequency bands corresponding to the multi-band exceeds the predetermined level.

Further, in the network measurement device 50 according to the present embodiment, the capturing means of the multi-band abnormality detection unit 65 is configured to include calculation means for calculating a pseudo distance from signals in at least two frequency bands corresponding to the multi-band transmitted from the same GNSS, and the alert notification control unit 66 is configured to notify the user that there is an abnormality when the pseudo distance calculated by using the calculation means meets a condition that the pseudo distance, which is set in advance as the predetermined signal quality, is positive.

With this configuration, in the network measurement device 50 according to the present embodiment, the user can easily recognize the abnormality in the antenna system for multi-band reception when the pseudo distance is positive.

The network measurement device 50 according to the present embodiment is a device that uses the 5G network 1, in which each apparatus such as the plurality of base stations 30, 31, and 32, or the boundary clock 21 operates in synchronization with the reference time information acquired from any GNSS (each is composed of the GNSS satellites 10a, 10b, and 10c), as a target, is moved to a desired location, is connected to any of the apparatuses in the location of a moving destination, and then starts positioning at the location based on the reception signal information from the GNSS, which is the transmission source, establishes synchronization with the transmission source GNSS, and then measures the performance of the 5G network 1.

With this configuration, in the network measurement device 50 according to the present embodiment, each apparatus such as the plurality of base stations 30, 31, and 32, or the boundary clock 21 is disposed, and the high precision measurement using the multi-band is possible by using the 5G network in which each apparatus operates in synchronization with the reference time information acquired from the GNSS, as the network under test.

Further, in the network measurement device 50 according to the present embodiment, any single GNSS among GNSSs such as a GPS, a GLONASS, a Galileo, a BeiDou, and a QZSS is configured to be set as the transmission source, and the plurality of signals are configured to be received from the single corresponding GNSS.

With this configuration, the network measurement device 50 according to the present embodiment can realize high precision measurement using the multi-band by setting any single GNSS among the GNSS such as a GPS, a GLONASS, a Galileo, a BeiDou, and a QZSS as the transmission source.

Further, in the network measurement device 50 according to the present embodiment, any plurality of GNSSs among GNSSs such as a GPS, a GLONASS, a Galileo, a BeiDou, a QZSS, is configured to be combined and set as the transmission sources, and signals in the plurality of frequency bands are configured to be received from the plurality of GNSSs.

According to the network measurement device 50 having such a configuration can reliably perform the multi-band reception processing and the multi-band reception abnormality notification that effectively utilize many GNSS by combining any plurality of GNSS among the GNSS such as a GPS, a GLONASS, a Galileo, a BeiDou, and a QZSS, and setting the GNSS as the transmission source of the multi-band.

Further, a measurement method according to the present embodiment is a measurement method of performing measurement on each apparatus such as the plurality of base stations 30, 31, and 32, or the boundary clock 21 by using the network measurement device 50 having the above configuration, the measurement method is configured to include a connection step (S3) of moving the measurement device 50 to disposition locations of the plurality of apparatuses disposed in different locations from each other, connecting the measurement device 50 to any of the apparatuses of the moving destination, and connecting the GNSS antenna (the belonging GNSS antenna 28a or the existing GNSS antenna 28b) to the antenna input terminal 51, a multi-band setting step (S5) of selectively (any) setting the GNSS, which is a transmission source of signals in the plurality of frequency bands corresponding to the multi-band (each composed of the GNSS satellites 10a, 10b, 10c), a reception abnormality detection step (S8) of detecting reception abnormality in signals in the plurality of frequency bands corresponding to the multi-band based on the GNSS antenna (the belonging GNSS antenna 28a or the existing GNSS antenna 28b) receiving the signal transmitted from the GNSS, which is the transmission source, and reception signal information obtained by the reception processing, and an alert notification step (S9) of notifying a user of an alert notification that a multi-band reception abnormality occurs when the reception abnormality in the signals in the plurality of frequency bands corresponding to the multi-band is detected.

With this configuration, in the measurement method according to the present embodiment, the network measurement device 50 having the above configuration is used, and in a case where the measurement is performed on the apparatus under test at locations different from each other when the desired multi-band cannot be normally received from any GNSS set as the transmission source, the user can quickly handle the resetting or the like by receiving the alert notification that the multi-band reception abnormality occurs and can reliably recognize the occurrence of the multi-band reception abnormality on the apparatus under test that requires extremely high time accuracy and precision. Therefore, the adoption of low precision measurement results is prevented in advance, and high precision measurement can be possible by taking an action to handle the reception abnormality.

INDUSTRIAL APPLICABILITY

As described above, the measurement device and the measurement method according to the present invention are capable of quickly responding to re-measurement when a reception abnormality in multi-band occurs, capable of performing the highly reliable and highly precise measurement, and useful for a multi-band supporting, a portable measurement device, and a measurement method in general, when the measurement is performed on an apparatus under test at each location that requires extremely high time accuracy and precision.

DESCRIPTION OF REFERENCE NUMERALS AND SIGNS 1 5G network (network under test)
10a, 10b, 10c GNSS satellite (a part of GNSS)
21 boundary clock (apparatus)
28a belonging GNSS antenna (GNSS antenna)
28b existing GNSS antenna (reception antenna system including GNSS antenna, cable, reception amplifier, filter, or the like)
30, 31, 32 base stations (apparatus)
50 network measurement device (measurement device)
51 antenna input terminal
52 GNSS receiver
58 network measurement terminal
59 1PPS measurement terminal
61 setting control unit (multi-band setting means)
65 multi-band abnormality detection unit (reception abnormality detection means)
66 alert notification control unit (alert notification means)

What is claimed is:

1. A portable measurement device that is moved to disposition locations of a plurality of apparatuses disposed in different locations from each other, is connected to any of the apparatuses of a moving destination, and then performs reception processing on desired signals in a plurality of frequency bands, among signals in frequency bands, which are different from each other, transmitted from a global navigation satellite system (GNSS) satellite that configures any GNSS, as a multi-band, and performs measurement on the apparatus of the moving destination based on information on a position or time acquired by the reception processing, the measurement device comprising:
  an antenna input terminal capable of connecting a GNSS antenna that receives a signal transmitted from the GNSS; and
  one or more processors collectively configured to:
  selectively set the GNSS, which is a transmission source of the signals in the plurality of frequency bands corresponding to the multi-band;
  detect a reception abnormality in the signals in the plurality of frequency bands corresponding to the multi-band based on reception signal information obtained by the reception processing on the signal transmitted from the selectively set GNSS, which is the transmission source, in a state in which the measurement device is connected to any of the apparatuses of the moving destination and the GNSS antenna is connected to the antenna input terminal;
  notify a user of an alert notification that a multi-band reception abnormality occurs when the reception abnormality is detected; and
  prompt the user to switch a setting of the selectively set GNSS, which is the transmission source, from a setting for performing reception processing on the multi-band to a setting for performing reception processing on a single band that is a signal in one frequency band.

2. The measurement device according to claim 1, wherein the antenna input terminal is capable of connecting an existing GNSS antenna among the plurality of apparatuses in place of a belonging GNSS antenna that belongs to the measurement device, and after the existing GNSS antenna is connected to the antenna input terminal, the measurement is performed based on the existing GNSS antenna receiving the signal transmitted from the selectively set GNSS, which is the transmission source, and the reception signal information obtained by the reception processing.

3. The measurement device according to claim 1, wherein the one or more processors are further collectively configured to notify the user of the alert notification by at least one of displaying an alert notification message or sounding an alert sound.

4. The measurement device according to claim 1, wherein the one or more processors are further collectively configured to:
   use signals in the plurality of frequency bands corresponding to the multi-band as targets,
   capture the signal transmitted from the selectively set GNSS, which is the transmission source,
   determine whether or not a signal quality of the captured signal meets a predetermined signal quality of the signals in the plurality of frequency bands corresponding to the set multi-band, and
   notify the user that multi-band reception is not possible when the signal quality of the signal captured by the capturing means does not meet the predetermined signal quality.

5. The measurement device according to claim 4, wherein the one or more processors are further collectively configured to:
   detect a level difference between signals in the plurality of frequency bands corresponding to the multi-band, and
   notify the user that there is an abnormality when the level difference detected by the level difference detection means exceeds a predetermined value set in advance.

6. The measurement device according to claim 4, wherein the one or more processors are further collectively configured to:
   calculate a pseudo distance from signals in at least two frequency bands corresponding to the multi-band transmitted from the same GNSS, and
   notify the user that there is an abnormality when the pseudo distance calculated by using the calculation means meets a condition that the pseudo distance, which is set in advance as the predetermined signal quality, is positive.

7. The measurement device according to claim 1, wherein the measurement device is a network measurement device that uses a network under test, in which the plurality of apparatuses operate in time synchronization with reference time information acquired from the any GNSS, as a measurement target, is moved to a desired location, is connected to any of the apparatuses, and then starts positioning at the location based on the reception signal information received from the GNSS, which is the transmission source, establishes time synchronization with the selectively set GNSS, which is the transmission source, and then measures performance of the network under test.

8. The measurement device according to claim 1, wherein any single GNSS among GNSSs comprising at least one of a GPS, a GLONASS, a Galileo, a BeiDou, and a QZSS is set as the transmission source, and signals in the plurality of frequency bands are received from the single GNSS.

9. The measurement device according to claim 1, wherein any plurality of GNSSs among GNSSs comprising at least one of a GPS, a GLONASS, a Galileo, a BeiDou, a QZSS, are combined and set as the transmission sources, and signals in the plurality of frequency bands are received from the plurality of GNSSs.

10. A measurement method of performing measurement on the apparatus by using the measurement device according to claim 1, the measurement method comprising:
    a connection step of moving the measurement device to disposition locations of the plurality of apparatuses disposed in different locations from each other, connecting the measurement device to any of the apparatuses of the moving destination, and connecting the existing GNSS antenna to the antenna input terminal;
    a multi-band setting step of selectively setting the GNSS, which is a transmission source of the signals in the plurality of frequency bands corresponding to the multi-band;
    a reception abnormality detection step of detecting reception abnormality in the signals in the plurality of frequency bands corresponding to the multi-band based on reception signal information obtained by the reception processing on the signal transmitted from the selectively set GNSS, which is the transmission source; and
    an alert notification step of notifying a user of an alert notification that a multi-band reception abnormality occurs when the reception abnormality is detected.

* * * * *